US008638985B2

(12) United States Patent
Shotton et al.

(10) Patent No.: US 8,638,985 B2
(45) Date of Patent: Jan. 28, 2014

(54) HUMAN BODY POSE ESTIMATION

(75) Inventors: Jamie Daniel Joseph Shotton, Cambridge (GB); Shahram Izadi, Cambridge (GB); Otmar Hilliges, Cambridge (GB); David Kim, Cambridge (GB); David Geoffrey Molyneaux, Oldham (GB); Matthew Darius Cook, Cambridge (GB); Pushmeet Kohli, Cambridge (GB); Antonio Criminisi, Hardwick (GB); Ross Brook Girshick, Chicago, IL (US); Andrew William Fitzgibbon, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 108 days.

(21) Appl. No.: 13/040,205

(22) Filed: Mar. 3, 2011

(65) Prior Publication Data

US 2011/0210915 A1 Sep. 1, 2011

Related U.S. Application Data

(63) Continuation-in-part of application No. 12/454,628, filed on May 20, 2009.

(60) Provisional application No. 61/174,878, filed on May 1, 2009.

(51) Int. Cl.
*G06K 9/00* (2006.01)

(52) U.S. Cl.
USPC .......................................... 382/103; 382/181

(58) Field of Classification Search
USPC ......................................................... 382/103
See application file for complete search history.

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 101254344 A | 9/2008 |
| EP | 0583061 A2 | 2/1994 |

(Continued)

OTHER PUBLICATIONS

Agarwal et al, "Learning Methods for Recovering 3D Human Pose from Monocular Images," retrived at <<http://research.microsoft.com/~ankagar/Publications/Agarwal-tr04.pdf>>, Technical Report 5333, INRIA Rhone-Alpes, Oct. 2004, 25 pgs.

(Continued)

*Primary Examiner* — Tom Y Lu
(74) *Attorney, Agent, or Firm* — Lee & Hayes, PLLC

(57) ABSTRACT

Techniques for human body pose estimation are disclosed herein. Images such as depth images, silhouette images, or volumetric images may be generated and pixels or voxels of the images may be identified. The techniques may process the pixels or voxels to determine a probability that each pixel or voxel is associated with a segment of a body captured in the image or to determine a three-dimensional representation for each pixel or voxel that is associated with a location on a canonical body. These probabilities or three-dimensional representations may then be utilized along with the images to construct a posed model of the body captured in the image.

21 Claims, 22 Drawing Sheets

(56) References Cited

U.S. PATENT DOCUMENTS

| | | | |
|---|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,741,756 B1 | 5/2004 | Toyama et al. |
| 6,765,726 B2 | 7/2004 | French et al. |
| 6,771,277 B2 | 8/2004 | Ohba |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,856,827 B2 | 2/2005 | Seeley et al. |
| 6,873,723 B1 | 3/2005 | Aucsmith et al. |
| 6,876,496 B2 | 4/2005 | French et al. |
| 6,879,709 B2 | 4/2005 | Tian et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,212,665 B2 | 5/2007 | Yang et al |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |

(56) References Cited

U.S. PATENT DOCUMENTS

| | | | |
|---|---|---|---|
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,627,139 | B2 | 12/2009 | Marks et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0046736 | A1 | 3/2004 | Pryor et al. |
| 2004/0207597 | A1 | 10/2004 | Marks |
| 2005/0059488 | A1 | 3/2005 | Larsen et al. |
| 2006/0188144 | A1 | 8/2006 | Sasaki et al. |
| 2006/0239558 | A1 | 10/2006 | Rafii et al. |
| 2007/0013718 | A1 | 1/2007 | Ohba |
| 2007/0060336 | A1 | 3/2007 | Marks et al. |
| 2007/0098222 | A1 | 5/2007 | Porter et al. |
| 2007/0216894 | A1 | 9/2007 | Garcia et al. |
| 2007/0217676 | A1 | 9/2007 | Grauman et al. |
| 2007/0260984 | A1 | 11/2007 | Marks et al. |
| 2007/0279485 | A1 | 12/2007 | Ohba et al. |
| 2007/0283296 | A1 | 12/2007 | Nilsson |
| 2007/0298882 | A1 | 12/2007 | Marks et al. |
| 2008/0001951 | A1 | 1/2008 | Marks et al. |
| 2008/0026838 | A1 | 1/2008 | Dunstan et al. |
| 2008/0062257 | A1 | 3/2008 | Corson |
| 2008/0100620 | A1 | 5/2008 | Nagai et al. |
| 2008/0126937 | A1 | 5/2008 | Pachet |
| 2008/0134102 | A1 | 6/2008 | Movold et al. |
| 2008/0137956 | A1 | 6/2008 | Yang et al. |
| 2008/0152191 | A1 | 6/2008 | Fujimura et al. |
| 2008/0152218 | A1 | 6/2008 | Okada |
| 2008/0215972 | A1 | 9/2008 | Zalewski et al. |
| 2008/0215973 | A1 | 9/2008 | Zalewski et al. |
| 2009/0141933 | A1 | 6/2009 | Wagg |
| 2009/0167679 | A1 | 7/2009 | Klier et al. |
| 2009/0175540 | A1 | 7/2009 | Dariush et al. |
| 2009/0221368 | A1 | 9/2009 | Yen et al. |
| 2009/0252423 | A1* | 10/2009 | Zhu et al. ............... 382/209 |
| 2010/0093435 | A1 | 4/2010 | Glaser et al. |
| 2010/0278384 | A1 | 11/2010 | Shotton et al. |
| 2011/0085705 | A1 | 4/2011 | Izadi et al. |
| 2012/0280897 | A1 | 11/2012 | Balan et al. |
| 2013/0136358 | A1 | 5/2013 | Dedhia et al. |

FOREIGN PATENT DOCUMENTS

| | | |
|---|---|---|
| JP | H0844490 A | 2/1996 |
| WO | WO9310708 | 6/1993 |
| WO | WO9717598 | 5/1997 |
| WO | WO9915863 A1 | 4/1999 |
| WO | WO9944698 | 9/1999 |
| WO | WO0159975 A2 | 8/2001 |
| WO | WO02082249 A2 | 10/2002 |
| WO | WO03001722 A2 | 1/2003 |
| WO | WO03046706 A1 | 6/2003 |
| WO | WO03054683 A2 | 7/2003 |
| WO | WO03071410 A2 | 8/2003 |
| WO | WO03073359 A2 | 9/2003 |
| WO | WO2009059065 A1 | 5/2009 |

OTHER PUBLICATIONS

Kanaujia et al, "Semi-Supervised Hierarchical models for 3D Human Pose Reconstruction," retrieved at <<http://www.cs.toronto.edu/~crismin/PAPERS/Smi-cvpr07.pdf>>, IEEE Conference on Computer Vision and Pattern Recognition, Jun. 17-22, 2007, pp. 1-8.

Laxton, "Monocular Human Pose Estimation," retrieved at <<http://vision.ucsd.edu/~blaxton/pagePAPERS/laxton_researchExam2007.pdf>>, University of California, San Diego, CA, 2007, 16 pgs.

Navaratnam et al, "Hierarchical Part-Based Human Body Pose Estimation," retrieved at <<http://mi.eng.cam.ac.uk/reports/svr-ftp/navaratnam_hierarchical.pdf>>, BMVC 2005, Sep. 5-8, 2005, Oxford, UK, 10 pgs.

Thayananthan et al, "Pose Estimation and Tracking Using Multivariate Regression," retrieved at <<http://svr-www.eng.cam.ac.uk/~bdrs2/papers/thayananthan_pr108.pdf>>, Elsevier, Oct. 8, 2007, pp. 1-15.

Zhong, "A Weighting Scheme for Content-Based Image Retrieval," retrieved at <<http://www.library.uow.edu.au/adt-NWU/uploads/approved/adt-NWU20080116.091123/public/01Front.pdf>>, University of Wollongong, Mar. 30, 2007, 13 pgs.

Qian et al, "A Gesture Driven Multimodal Interactive Dance System", IEEE Intl Conf on Multimedia and Expo, Jun. 2004, 4 pgs.

Shivappa et al, "Person Tracking with Audio Visual Cues Using the Iterative Decoding Framework", IEEE 5th Intl Conf on Advanced Video and Signal Based Surveillance, Sep. 2008, pgs. 260-267.

"The Case for Kinect" Eurogamer [online], Aug. 7, 2007, pp. 1-7. Retrieved from the Internet on Aug. 20, 2010: URL: <http://www.eurogamer.net/articles/digitalfoundry-the-case-for-kinect-article?p.=2>.

"Virtual High Anxiety", Tech Update, Aug. 1995, 1 pgs.

Aggarwal et al., "Human Motion Analysis: A Review", IEEE Non-rigid and Articulated Motion Workshop, Jun. 1997, University of Texas at Austin, Austin, TX, 13 pgs.

Azarbayejani et al., "Visually Controlled Graphics", Jun. 1993, vol. 15, No. 6, IEEE Transactions on Pattern Analysis and Machine Intelligence, 4 pgs.

Bobic, "Rotating Objects Using Quaternions," Gamasutra [online], Jul. 5, 1998, pp. 1-5. Retrieved from the Internet on Aug. 20, 2010: URL: <http://www.gamasutra.com/view/feature/3278/rotating_objects_using_guaternions.php? p.=2>.

Breen et al., "Interactive Occlusion and Collusion of Real and Virtual Objects in Augmented Reality", Technical Report ECRC-95-02, 1995, European Computer-Industry Research Center GmbH, Munich, Germany, 22 pgs.

Brogan et al., "Dynamically Simulated Characters in Virtual Environments", Sep. and Oct. 1998, pp. 2-13, vol. 18, Issue 5, IEEE Computer Graphics and Applications.

Crawford, "How Microsoft Kinect Works," Howstuffworks [online], pp. 1-4. Retrieved from the Internet on Aug. 19, 2010: URL: <http://electronics.howstuffworks.com/microsoft-kinect.htm/printable>.

Fisher et al., "Virtual Environment Display System", ACM Workshop on Interactive 3D Graphics, Oct. 1986, Chapel Hill, NC, 12 pgs.

Fitzgerald, et al. "Integration if kinematic Analysis into Computer Games for Exercise." Proceedings of CGAMES 2006—9th Interna-

(56) References Cited

OTHER PUBLICATIONS tional Conference on Computer Games: AI, Animation, Mobile, Educational and Serious Games, Nov. 22-26, 2006, pp. 24-28, Dublin, Ireland.

Freeman et al., "Television Control by Hand Gestures", Dec. 1994, Mitsubishi Electric Research Laboratories, TR94-24, Caimbridge, MA, 7 pgs.

Granieri et al., "Simulating Humans in VR", The British Computer Society, Oct. 1994, Academic Press, 15 pgs.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY, 12 pgs.

He, "Generation of Human Body Models", Apr. 2005, University of Auckland, New Zealand, 111 pgs.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France, 6 pgs.

Isard et al., "CONDENSATION-Conditional Density Propagation for Visual Tracking", Aug. 1998, pp. 5-28, International Journal of Computer Vision 29(1), Netherlands.

English Machine Translation of Japanese Publication No. JPH0844490 published on Feb. 16, 1996, 11 pgs.

Kanade et al., "A Stereo Machine for Video-rate Dense Depth Mapping and Its New Applications", IEEE Computer Society Conference on Computer Vision and Pattern Recognition, Jun. 1996, pp. 196-202, The Robotics Institute, Carnegie Mellon University, Pittsburgh, PA.

"Kinect is your personal trainer in EA Sports Active 2" Gamerss [online], Jul. 26, 2010. Retrieved from the Internet on Aug. 20, 2010: URL: <http://www.gamerss.co.uk/kinect-is-your-personal-trainer-in-ea-sports-active-2>, 4 pgs.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", Jul. 1997, Germany, 35 pgs.

Kohler, "Vision Based Remote Control in Intelligent Home Environments", University of Erlangen-Nuremberg/Germany, Nov. 1996, pp. 147-154, Germany.

Livingston, "Vision-based Tracking with Dynamic Structured Light for Video See-through Augmented Reality", Dec. 1998, University of North Carolina at Chapel Hill, North Carolina, 145 pgs.

Miyagawa et al., "CCD-Based Range Finding Sensor", Oct. 1997, pp. 1648-1652, vol. 44 No. 10, IEEE Transactions on Electron Devices.

Parrish, "Microsoft Does Want Core Games, FPS for Kinect." Tom's Guide: Tech for Real Life [online], Jun. 23, 2010, pp. 1-5. Retrieved from the Internet on Aug. 20, 2010: URL: <http://www.tomsguide.com/us/Core-Gamers-Kinect-FPS-Action,news-7195.html>.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Rosenhahn et al., "Automatic Human Model Generation", Nov. 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan, 8 pgs.

Sheridan et al., "Virtual Reality Check", Technology Review, Oct. 1993, pp. 22-28, vol. 96, No. 7.

"Simulation and Training", 1994, Division Incorporated, 6 pgs.

Stevens, "Flights into Virtual Reality Treating Real World Disorders", The Washington Post, Mar. 27, 1995, Science Psychology, 2 pages.

Toyama, Kentaro, et al., "Probabilistic Tracking in a Metric Space," Eighth International Conference on Computer Vision, Vancouver, Canada, vol. 2, Jul. 2001, 8 pages.

Tresadern, "Visual Analysis of Articulated Motion" DPhil Thesis, University of Oxford, Oct. 12, 2006, pp. 1-171. Oxford, U.K.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", Jul. 2001, The Robotics Institute, Carnegie Mellon University, Pittsburgh, PA, 121 pgs.

* cited by examiner

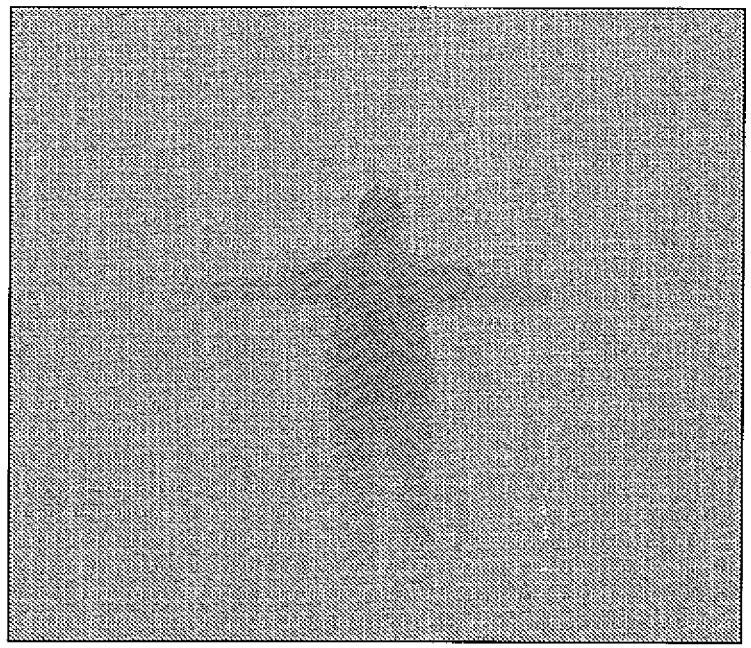
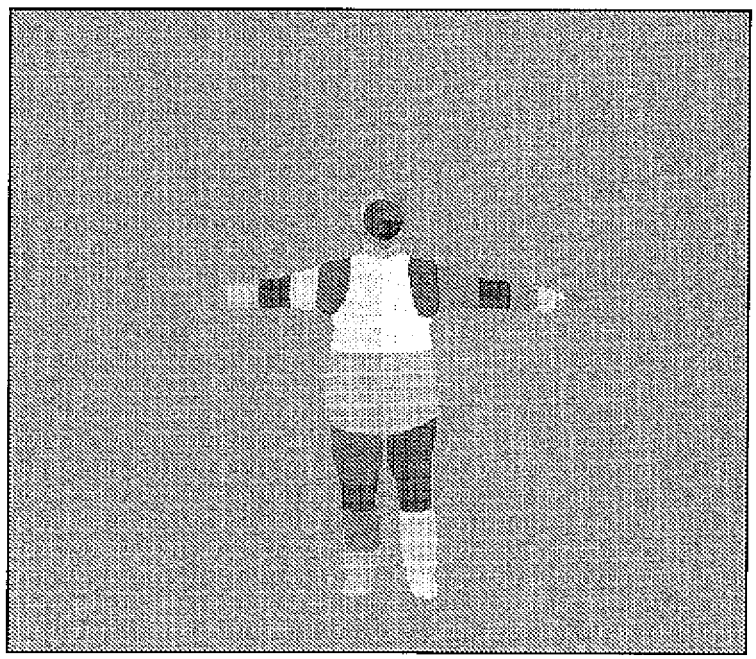
FIG. 12

HUMAN BODY POSE ESTIMATION

STATEMENT OF PRIORITY

The present application is a continuation-in-part of and claims priority to U.S. patent application Ser. No. 12/454,628, titled "Human Body Pose Estimation" filed on May 20, 2009, which in turn claims priority to U.S. provisional patent application 61/174,878, titled "Human Body Pose Estimation" filed May 1, 2009. The contents of these applications are incorporated herein in their entirety.

BACKGROUND

In a typical computing environment, a user has an input device such as a keyboard, a mouse, a joystick or the like, which may be connected to the computing environment by a cable, wire, wireless connection or the like. If control of a computing environment were to be shifted from a connected controller to gesture or pose based control, the system will need effective techniques to be able to determine what poses or gestures a person is making. Interpreting gestures or poses in a tracking and processing system without knowing the pose of a user's body may cause the system to misinterpret commands, or to miss them all together.

Further, a user of a tracking and processing system may stand at one of various different possible angles with respect to a capture device, and the user's gesture may appear differently to the capture device depending upon the particular angle of the user with respect to the capture device. For example, if the capture device is unaware that the user is not directly facing the capture device, then the user extending his arm directly forward could possibly be misinterpreted by the capture device as the user extending his arm partially to the left or the right. Thus, the system may not work properly without body pose estimation. Further, if the estimation technique used is not fine-grained enough, smaller gestures such as finger movements may not be detected.

SUMMARY

Techniques for human body pose estimation are disclosed herein. Depth map images from a depth camera may be processed to calculate a probability that each pixel of the depth map is associated with one or more segments or body parts of a body. In some implementations, silhouette images or volumetric images may be used in place of the depth map images. Body parts may then be constructed of the pixels and processed to define joints or nodes of those body parts. The nodes or joints may be provided to a system which may construct a model of the body from the various nodes or joints.

In other implementations, rather than calculating probabilities that the pixels are associated with segments of the body, the techniques may instead involve determining, for each pixel, a three-dimensional representation that is associated with a location on a canonical body. For example, a three-dimensional coordinate and variance associated with a specific location on a canonical body (e.g., a location on the left hand) may be determined for a given pixel. The three-dimensional representations and the image are then utilized to construct a posed model of the body.

In an embodiment, a first pixel of a depth map may be associated with one or more body parts of one or more users. Association with a body part may mean that there is a high probability that the first pixel is located within the body part. This probability may be determined by measuring the background depth, the depth of the first pixel, and the depth of various other pixels around the first pixel.

The location and angle at which various other pixels around the first pixel may be measured for depth may be determined by a feature test training program. In one embodiment, each time the depth at a pixel is measured, a determination of whether the pixel is within the depth range of the body is made. Based on the determination, the distance and angle for the next test pixel may be provided. Selecting the test pixels in such a way may increase the efficiency and robustness of the system.

Body poses, which may include pointing, xyz coordinates, joints, rotation, area, and any other aspects of one or more body parts of user may be estimated for multiple users. In an embodiment, this may be accomplished by assuming a user segmentation. For example, values may be assigned to an image such that a value 0 represents background, value 1 represents user 1, value 2 represents user 2, etc. Given this player segmentation image, it is possible to classify all user 1 pixels and do a three dimensional centroid finding, and then repeat this process for subsequent users. In another embodiment, background subtraction may be performed and the remaining foreground pixels (belonging to the multiple users) may then be classified as associated with one or more body parts. In a further embodiment, the background may be considered another 'body part' and every pixel in the frame may be considered and associated with one or more body parts, including the background. When computing centroids, it may be ensured that each centroid is spatially localized, so that a respective body part is present for each user. The centroids may then be combined into coherent models by, for example, connecting neighboring body parts throughout each user's body.

In an embodiment, after one or more initial body part probabilities are calculated for each pixel, the initial probabilities for each pixel may be compared with the initial probabilities of one or more offset adjacent pixels to further refine the probability calculations. For example, if the initial probabilities suggest that adjacent pixels are in the same or adjacent body parts (i.e., head and neck), then this would increase the probabilities of the initial calculations. By contrast, if the initial probabilities suggest that adjacent pixels are in non-adjacent body parts (i.e., head and foot), then this would decrease the probabilities of the initial calculations.

BRIEF DESCRIPTION OF THE DRAWINGS

The systems, methods, and computer readable media for body pose estimation in accordance with this specification are further described with reference to the accompanying drawings in which:

FIG. 12 depicts an example embodiment of a segmented body used in body pose estimation.

DETAILED DESCRIPTION OF ILLUSTRATIVE EMBODIMENTS

As will be described herein, a tracking and processing system may determine body pose estimation. When a user makes a gesture or pose, a tracking and processing system may receive the gesture or pose and associate one or more commands with the user. In order to determine what response to provide the user of a computing environment, the system may need to be able to determine the body pose of the user. Body poses may also be used to determine skeletal models, determine the location of particular body parts and the like.

In an example embodiment, a tracking and processing system is provided with one or more capture devices, such as 2D cameras, 3D cameras, and/or depth cameras. The camera or cameras may capture one or more images of an image scene, such as depth map images or 2D, RGB images. In some implementations, these images may be used to construct silhouette images or volumetric images. The computing environment may perform one or more processes on the image to assign pixels or voxels on the image to 2D segments or 3D volumes (the 2D segments and 3D volumes hereinafter referred to as "segments") of the users body. From these assigned body parts, the computing environment may obtain nodes, centroids or joint positions of the body parts, and may provide the nodes, joints or centroids to one or more processes to create a 3D model of the body pose. In one aspect, the body pose is the three dimensional location of the set of body parts associated with a user. In another aspect, pose includes the three dimensional location of the body part, as well as the direction it is pointing, the rotation of the body segment or joint as well as any other aspects of the body part or segment.

In another example embodiment, a tracking and processing system may determine 3D representations for pixels or voxels that reference locations on a model body having a canonical pose, shape, and/or size. These 3D representations may be determined in place of assigning pixels or voxels to segments of a body. The 3D representations determined for the pixels or voxels and the image to which the pixels or voxels belong may then be utilized by the system to determine the body pose captured by the image.

Figure 1A:
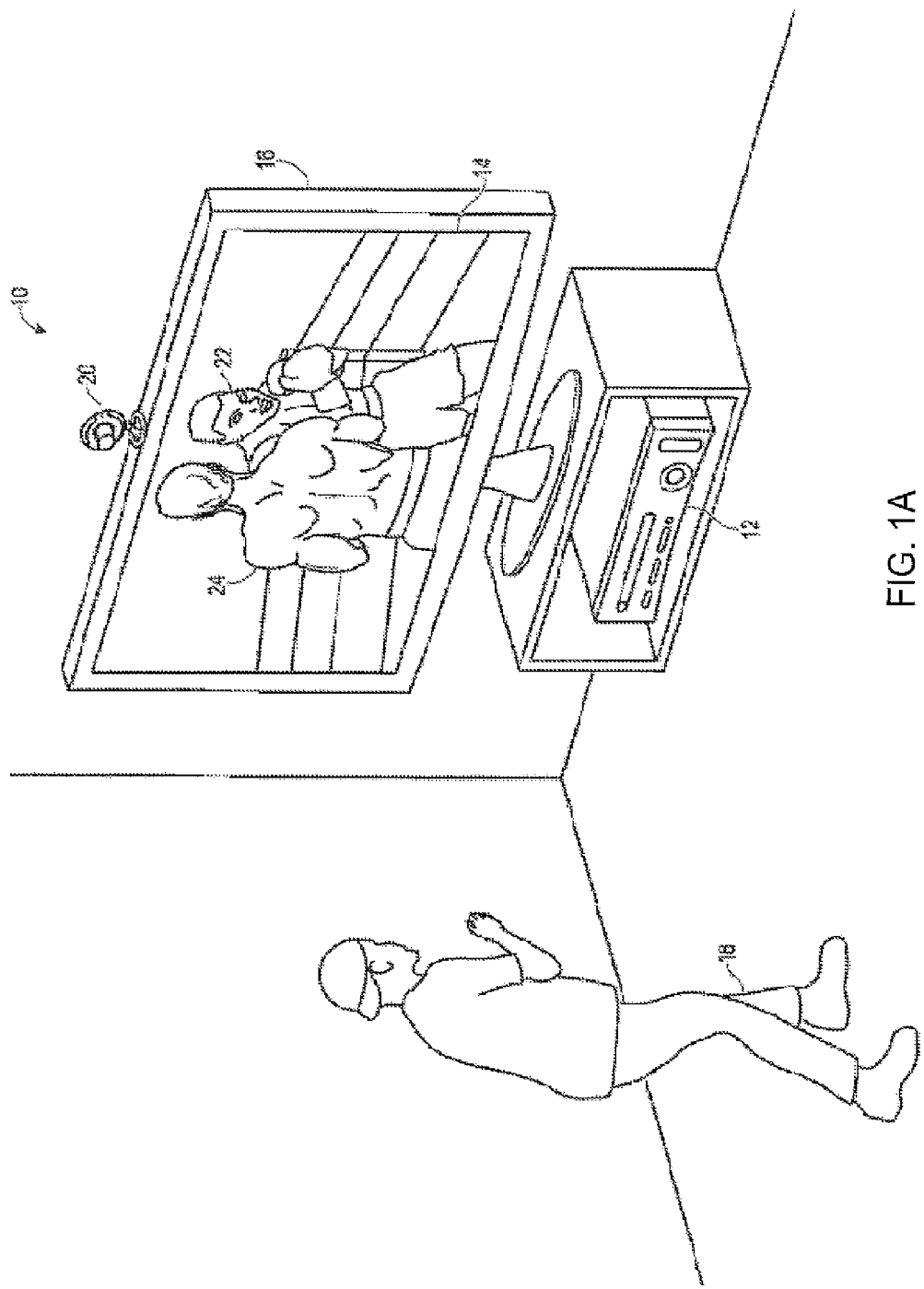
FIGS. 1A, 1B, 1C, and 1D illustrate an example embodiment of a tracking and processing system with a user playing a game.
Figure 1B:
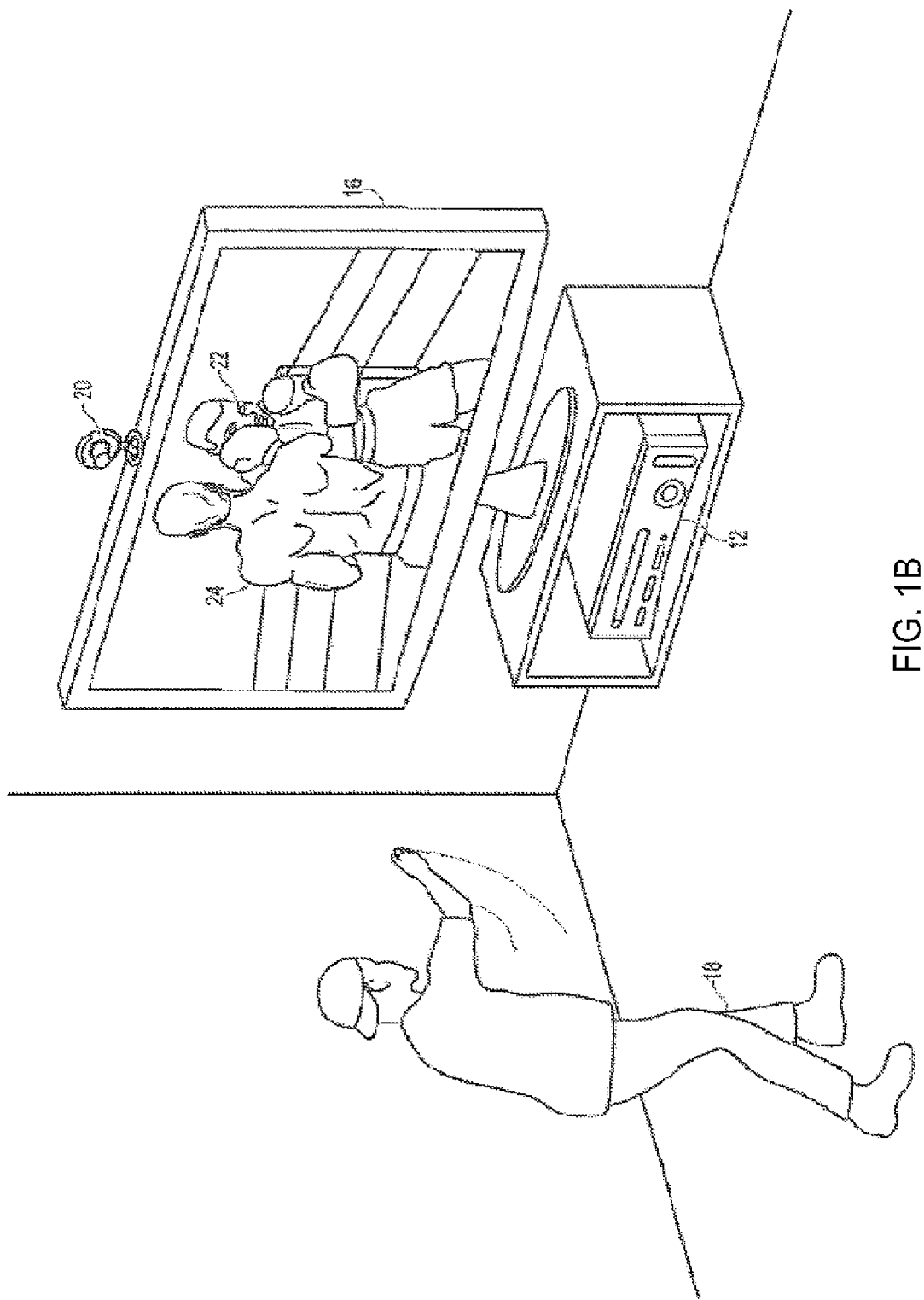
Figure 1C:
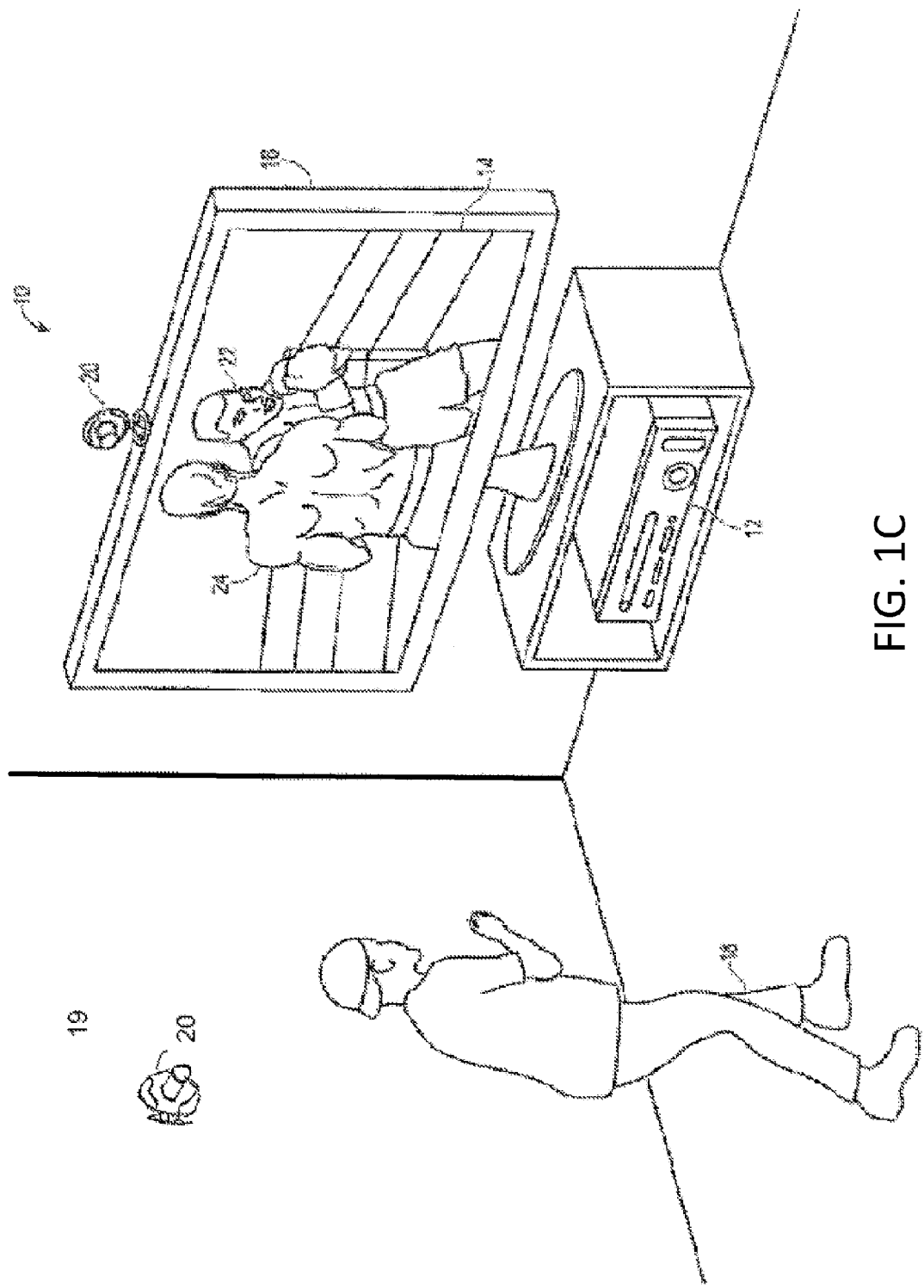

FIGS. 1A, 1B, and 1C illustrate an example embodiment of a configuration of a tracking and processing system 10 utilizing body pose estimation with a user 18 playing a boxing game. In an example embodiment, the tracking and processing system 10 may be used to, among other things, determine body pose, bind, recognize, analyze, track, associate to a human target, provide feedback, interpret poses or gestures, and/or adapt to aspects of the human target such as the user 18.

As shown in FIG. 1A, the tracking and processing system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the tracking and processing system 10 may further include a capture device 20. The capture device 20 may be, for example, a detector that may be used to monitor one or more users, such as the user 18, such that poses performed by the one or more users may be captured, analyzed, processed, and tracked to perform one or more controls or actions within an application, as will be described in more detail below.

According to one embodiment, the tracking and processing system 10 may be connected to an audiovisual device 16 such as a television, a monitor, a high-definition television (HDTV), or the like that may provide game or application visuals and/or audio to the user 18. For example, the computing environment 12 may include a video adapter such as a graphics card and/or an audio adapter such as a sound card that may provide audiovisual signals associated with the feedback about virtual ports and binding, game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, a wireless connection or the like.

As shown in FIGS. 1A and 1B, the tracking and processing system 10 may be used to recognize, analyze, process, determine the pose of, and/or track a human target such as the user 18. For example, the user 18 may be tracked using the capture device 20 such that the position, movements and size of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a user avatar 24 that the user 18 may control with his or her movements on a screen 14. For example, as shown in FIG. 1B, the user 18 may throw a punch in physical space to cause the user avatar 24 to throw a punch in game space. Thus, according to an example embodiment, the computer environment 12 and the capture device 20 of the tracking and processing system 10 may be used to recognize and analyze the punch of the user 18 in physical space such that the punch may be interpreted as a game control of the user avatar 24 in game space.

The user 18 may be associated with a virtual port in computing environment 12. Feedback of the state of the virtual port may be given to the user 18 in the form of a sound or display on audiovisual device 16, a display such as an LED or light bulb, or a speaker on the computing environment 12, or any other means of providing feedback to the user. The feedback may be used to inform a user when he is in a capture area of capture device 20, if he is bound to the tracking and processing system 10, what virtual port he is associated with, and when he has control over an avatar such as avatar 24. Gestures and poses by user 18 may change the state of the system, and thus the feedback that the user receives from the system.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the user avatar 24. For example, the user may use movements to enter, exit, turn system on or off, pause, volunteer, switch virtual ports, save a game, select a level, profile or menu, view high scores, communicate with a friend, etc. Additionally, a full range of motion of the user 18 may be available, used, and analyzed in any suitable manner to interact with an application.

As shown in FIG. 1C, in an example embodiment, multiple capture devices 20 may be used to monitor one or more users, such as the user 18, such that poses performed by the one or more users may be captured, analyzed, processed, and tracked to perform one or more controls or actions within an application. In such an embodiment, the capture devices 20 may be positioned at different angles with respect to each other to enable capture of user poses from multiple perspectives. For example, as shown FIG. 1C, one capture device 20 may be mounted to audiovisual device 16 and capture a frontal perspective of the user. Another capture device 20 may be mounted to a wall 19, the plane of the wall 19 being oblique with respect to a plane formed by the surface of the audiovisual device 16. This other capture device 20 may capture a side perspective of the user. Also, in a further example, a capture device 20 may be mounted to each wall of a room to ensure that a user is captured from a plurality of perspectives, such as front, back, left and right.

Figure 1D:
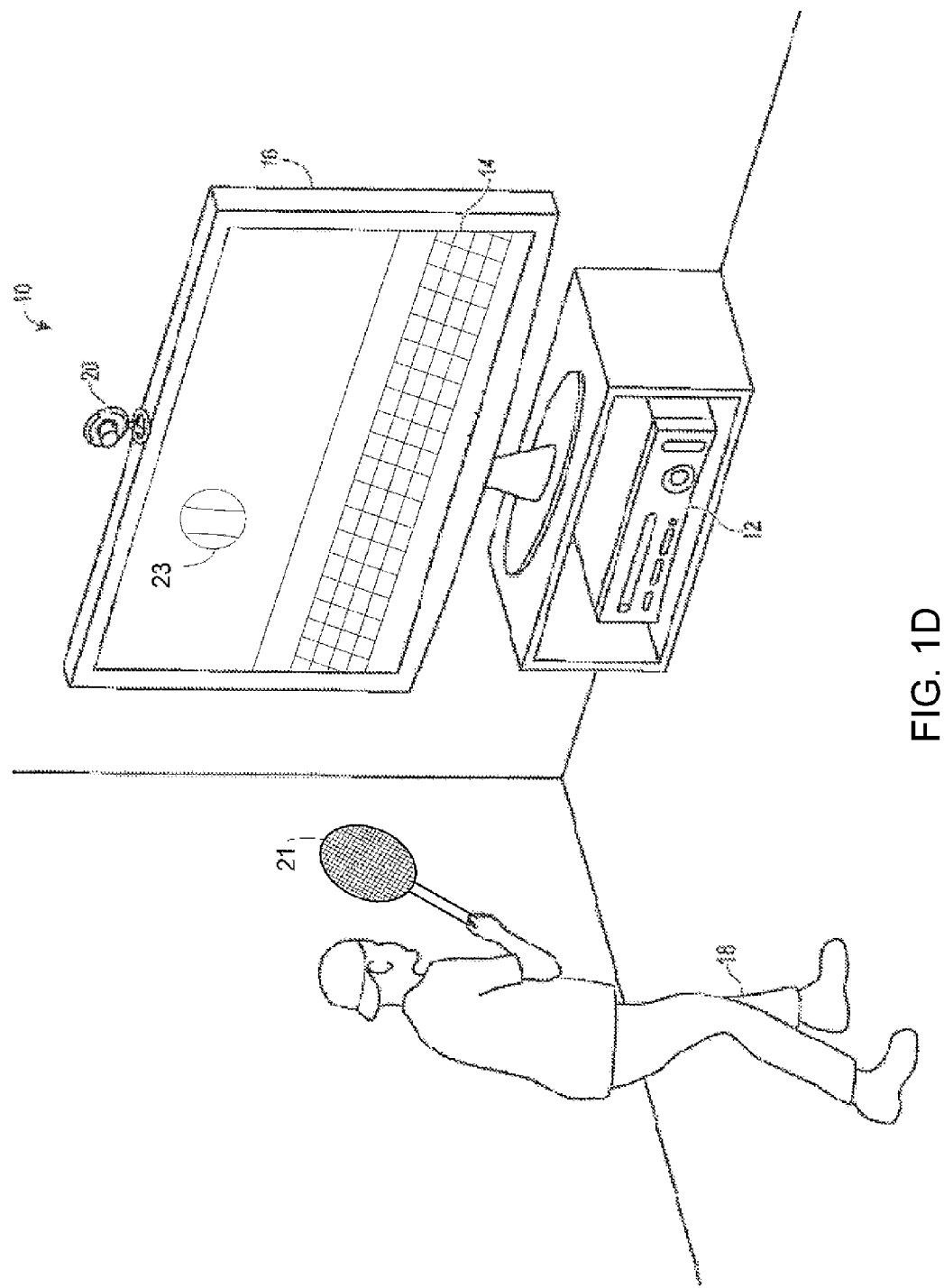

In FIG. 1D, the human target such as the user 18 may have an object such as racket 21. In such embodiments, the user of an electronic game may be holding the object such that the motions of the user and the object may be used to adjust and/or control parameters of the game, such as, for example, hitting an onscreen ball 23. The motion of a user holding a racket 21 may be tracked and utilized for controlling an on-screen racket in an electronic sports game. In another example embodiment, the motion of a user holding an object may be tracked and utilized for controlling an on-screen weapon in an electronic combat game. Any other object may also be included, such as one or more gloves, balls, bats, clubs, guitars, microphones, sticks, pets, animals, drums and the like.

According to other example embodiments, the tracking and processing system 10 may further be used to interpret target movements as operating system and/or application controls that are outside the realm of games. For example, virtually any controllable aspect of an operating system and/or application may be controlled by movements of the target such as the user 18.

Figure 2:
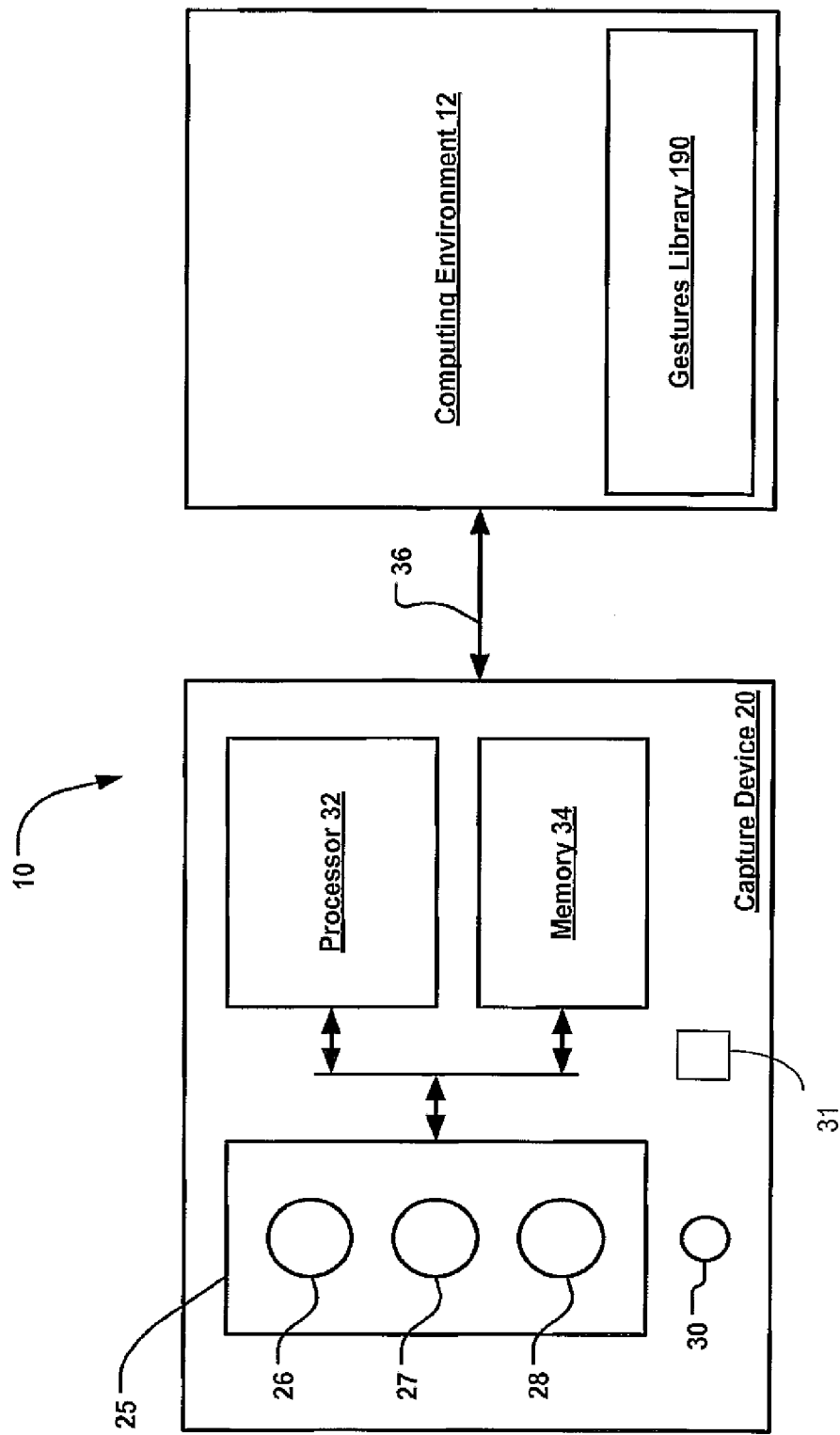
FIG. 2 illustrates an example embodiment of a capture device that may be used in a tracking and processing system.

As shown in FIG. 2, according to an example embodiment, the image camera component 25 may include an IR light component 26, a three-dimensional (3D) camera 27, and/or a two-dimensional (2D), RGB camera 28 that may be used to capture an image of a scene and, optionally, its depth. For example, in time-of-flight analysis, the IR light component 26 of the capture device 20 may emit an infrared light onto the scene and may then use sensors (not shown) to detect the backscattered light from the surface of one or more targets and objects in the scene using, for example, the 3D camera 27 and/or the 2D, RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 26. Upon striking the surface of one or more targets or objects in the scene, the pattern may become deformed in response. Such a deformation of the pattern may be captured by, for example, the 3D camera 27 and/or the 2D, RGB camera 28 and may then be analyzed to determine a physical distance from the capture device to a particular location on the targets or objects.

In a further example embodiment, the capture device 20 may utilize a 2D, RGB camera 28 to capture a plurality of 2D, RGB images. For example, the 2D, RGB camera 28 may capture a background image when the user is not present and a further image when the user is present. Alternatively, a model of the background may be built up over time based on which parts of the image are static and which parts are moving. Logic associated with the capture device 20 may then utilize one or more background subtraction algorithms or other algorithms, such as the GrabCut algorithm or geodesic segmentation, to generate a silhouette image. As used herein, a silhouette image is a binary mask image comprised of foreground and background portions. The foreground portion is comprised of the user's body, and the background portion is comprised of the background surrounding the user. The background subtraction algorithms may separate the foreground from the background by comparing RGB pixel values of the images. To determine a depth value for the body/foreground, the capture device 20 may employ a low resolution depth sensor to determine depth readings of points associated with the body/foreground. Logic associated with the capture device 20 may then determine an average depth from the depth readings and may use that depth average as the depth of the body/foreground. In other embodiments, the capture device 20 may not have any mechanism for determining a depth, and logic of associated with the capture device 20 may assume a default value to be the depth of the body/foreground. Assuming a default depth value may involve assuming that the RGB camera is calibrated and/or assuming a known, default, or averaged height and/or size of a player. In other implementations, generating the silhouette image, calculating an average depth, or using a default depth may be performed by logic associated with the computing environment 12 rather than logic associated with the capture device 20.

According to another embodiment, the capture device 20 may include two or more physically separated cameras that may view a scene from different angles, to obtain visual stereo data that may be resolved to generate depth information. Depth may also be determined by capturing images using one or more detectors that may be monochromatic, infrared, RGB or any other type of detector and performing a parallax calculation.

In a further embodiment, where the capture device 20 includes two or more cameras or where two or more capture devices 20 are used (e.g., as shown in FIG. 1C), multiple depth images may be captured and may be used to generate a volumetric image of the user and the user's surroundings. The depth images may be generated using any of the components and techniques described above. The volumetric image may then be generated by logic associated with one of the capture devices 20 or with the computing environment 12. As mentioned, when multiple cameras are used, images of the user may be captured from multiple perspectives. Once these images from multiple perspectives are captured, the logic may use any of a number of known algorithms to generate a volumetric image from the multiple perspective images. In other embodiments, where the capture device 20 includes two or more cameras or where two or more capture devices 20 are used (e.g., as shown in FIG. 1C), the capture device(s) 20 may using the multiple cameras to capture and generate multiple depth images or multiple silhouette images that may each be processed separately rather than combined into a volumetric image.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the tracking and processing system 10. Additionally, the microphone 30 may be used to receive audio signals that may also be provided by the user to control applications such as game applications, non-game applications, or the like that may be executed by the computing environment 12.

The capture device 20 may further include a feedback component 31. The feedback component 31 may comprise a light such as an LED or a light bulb, a speaker or the like. The feedback device may perform at least one of changing colors, turning on or off, increasing or decreasing in brightness, and flashing at varying speeds. The feedback component 31 may also comprise a speaker which may provide one or more sounds or noises as a feedback of one or more states. The feedback component 31 may also work in combination with computing environment 12 or processor 32 to provide one or more forms of feedback to a user by means of any other element of the capture device, the tracking and processing system or the like. For example, the feedback component 31 may be used to indicate when a user is standing at a specified distance from the capture device 20. This may be especially useful in embodiments where the depth assigned the pixels including the user's body is a default depth value.

In an example embodiment, the capture device 20 may further include a processor 32 that may be in operative communication with the image camera component 25. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, determining the body pose, or any other suitable instruction.

The capture device 20 may further include a memory component 34 that may store the instructions that may be executed by the processor 32, images or frames of images captured by the 3D camera or RGB camera, user profiles or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 25 and the processor 32. According to another embodiment, the memory component 34 may be integrated into the processor 32 and/or the image capture component 25.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3D camera 27 and/or the 2D, RGB camera 28, and a skeletal model that may be generated by the capture device 20 or the computing environment to the computing environment 12 via the communication link 36. The computing environment 12 may then use the skeletal model, depth information, and captured images to, for example, create a virtual screen, adapt the user interface and control an application such as a game or word processor. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 27, 28 and capture device 20 in the form of the skeletal model and movements associated with it may be compared to the gesture filters in the gesture library 190 to identify when a user (as represented by the skeletal model) has performed one or more gestures. Those gestures or poses may be associated with various controls of an application. Thus, the computing environment 12 may use the gestures library 190 to interpret movements of the skeletal model and to control an application based on the movements.

Figure 3:
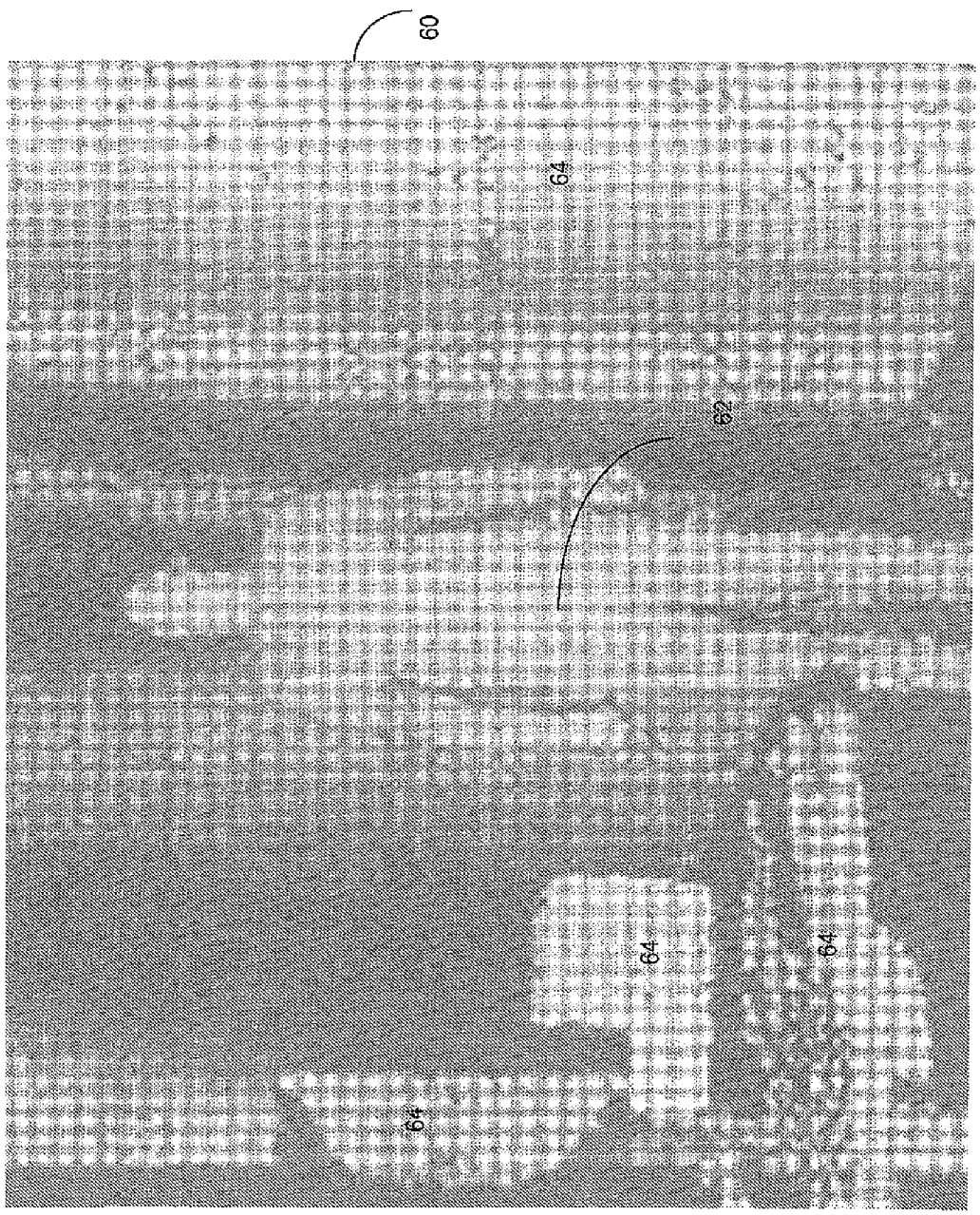
FIG. 3 depicts an example embodiment of a depth image.

FIG. 3 illustrates an example embodiment of a depth image 60 that may be received by the tracking and processing system and/or the computing environment. According to an example embodiment, the depth image 60 may be an image or frame of a scene captured by, for example, the 3D camera 27 and/or the RGB camera 28 of the capture device 20 described above with respect to FIG. 2. As shown in FIG. 3, the depth image 60 may include a human target 62 and one or more non-human targets 64 such as a wall, a table, a monitor, or the like in the captured scene. As described above, the depth image 60 may include a plurality of observed pixels where each observed pixel has an observed depth value associated therewith. For example, the depth image 60 may include a two-dimensional (2-D) pixel area of the captured scene where each pixel in the 2-D pixel area may represent a depth value such as a length or distance in, for example, centimeters, millimeters, or the like of a target or object in the captured scene from the capture device.

According to one embodiment, a depth image such as depth image 60 or an image on an RGB camera such as camera 28, or an image on any other detector may be processed and used to determine the shape and size of a target. In another embodiment, the depth image 60 may be used to determine the body pose of a user. The body may be divided into a series of segments and each pixel of a depth map 60 may be assigned a probability that it is associated with each segment. This information may be provided to one or more processes which may determine the location of nodes, joints, centroids or the like to determine a skeletal model and interpret the motions of a user 62 for pose or gesture based command. In a further embodiment, rather than dividing the body into segments and assigning probabilities to pixels, the body may be defined by a set of 3D representations (e.g., a continuous set of 3D representations), such as 3D coordinates and variances, which reference locations on a model body having a canonical pose, shape, and/or size. One or more of such 3D representations may be calculated for each pixel of the depth image 60 and may be used along with the depth image 60 to determine the body pose of the user. These 3D representations may have, theoretically speaking, infinite resolution.

Referring back to FIG. 2, in one embodiment, upon receiving the depth image, the depth image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to size a virtual screen on a user as described above.

Figure 4:
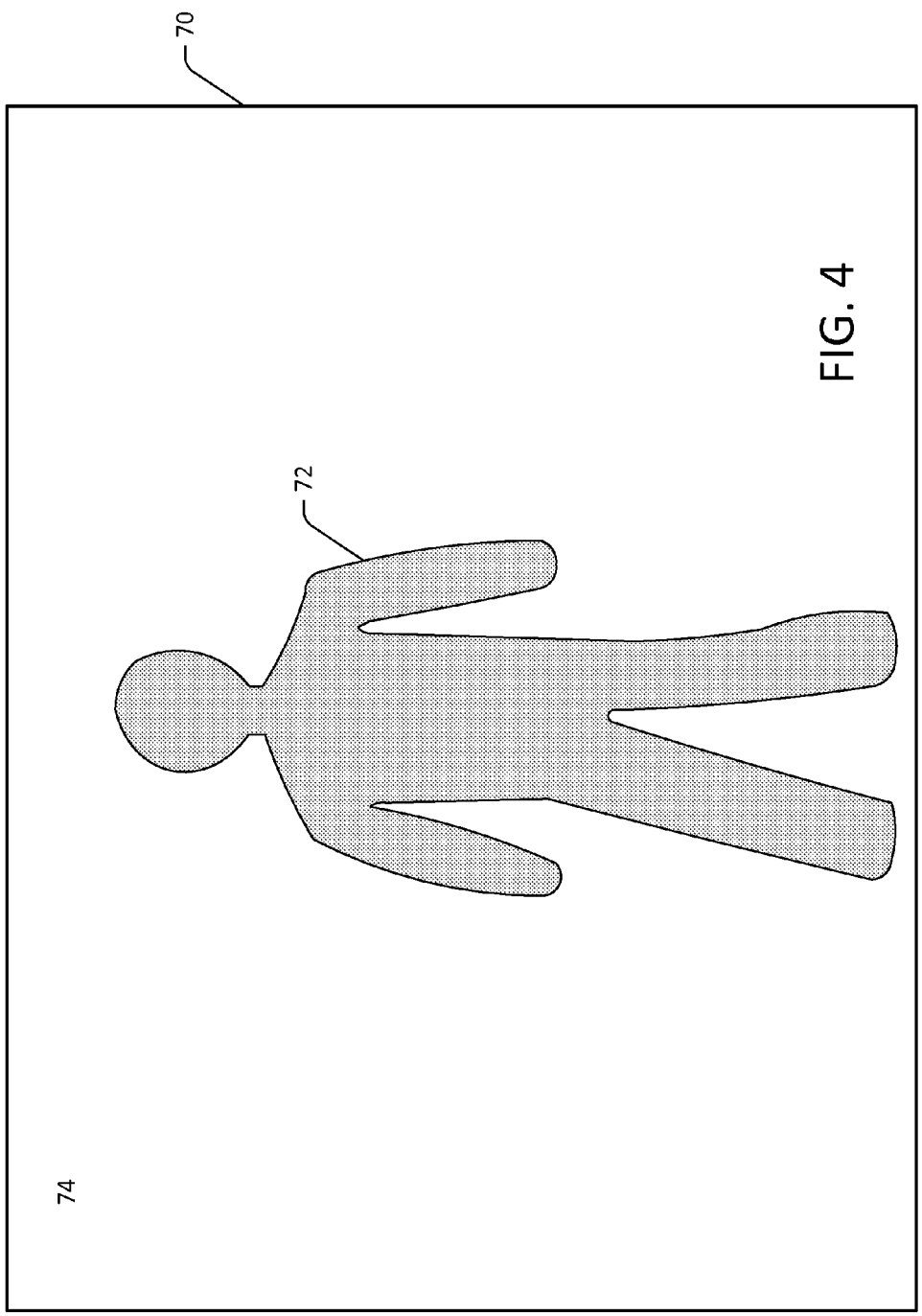
FIG. 4 depicts an example embodiment of a silhouette image.

FIG. 4 illustrates an example embodiment of a silhouette image 70 that may be generated by the tracking and processing system and/or the computing environment from 2D, RGB images. As mention above, these 2D, RGB images may be images or frames of a scene captured by, for example, the 2D, RGB camera 28 of the capture device 20. The 2D, RGB images may be captured at different times, such as before the user is present and once the user is present, and may be processed using background subtraction algorithms or other algorithms to generate the silhouette image 70. Also, silhouette image 70 may be obtained in other ways, such as using stereo RGB cameras or using green- or blue-screening. As shown in FIG. 4, the silhouette image 70 comprises two portions: a foreground portion 72 that represents the human target (i.e., the body of the user) and a background portion 74 that represents non-human targets such as a wall, a table, a monitor, or the like in the captured scene. Each pixel of the silhouette image 70 that belongs to the foreground portion 72 is associated with a same depth value. Or, as another way of putting this, the silhouette image 70 itself is associated with a depth value that refers to a depth of the foreground portion 72. As mentioned above, this depth value may be a default value or may be calculated from depths measured for multiple ones of the pixels belonging to the foreground portion 72. This calculated or default depth value may represent a length or distance in, for example, centimeters, millimeters, or the like of foreground portion 72 from the capture device 20.

According to one embodiment, the silhouette image 70 may be used to determine the body pose of a user. The body may be divided into a series of segments and each pixel of a silhouette image 70 may be assigned a probability that it is associated with each segment. This information may be provided to one or more processes which may determine the location of nodes, joints, centroids or the like to determine a skeletal model and interpret the motions of a user represented by foreground portion 72 for pose or gesture based command. In a further embodiment, rather than dividing the body into segments and assigning probabilities to pixels, the body may be defined by a set of 3D representations, such as 3D coordinates and variances, which reference locations on a model body having a canonical pose, shape, and/or size. Such 3D representations may be calculated for each pixel of the silhouette image 70 and may be used along with the silhouette image 70 to determine the body pose of the user.

Referring back to FIG. 2, in one embodiment, upon receiving the 2D, RGB images, those images may be downsampled to a lower processing resolution such that the silhouette image 70 generated from those images may be more easily used and/or more quickly processed with less computing overhead. In another embodiment, the 2D, RGB images are not downsampled, but the resulting silhouette image 70 may be downsampled to a lower processing resolution. Additionally, one or more high-variance and/or noisy depth values may be removed and/or smoothed when calculating a depth value for the foreground portion 72; portions of missing and/or removed depth information may be filled in and/or reconstructed; and/or any other suitable processing may be performed on the received depth information may such that the depth information may used to size a virtual screen on a user as described above.

Figure 5:
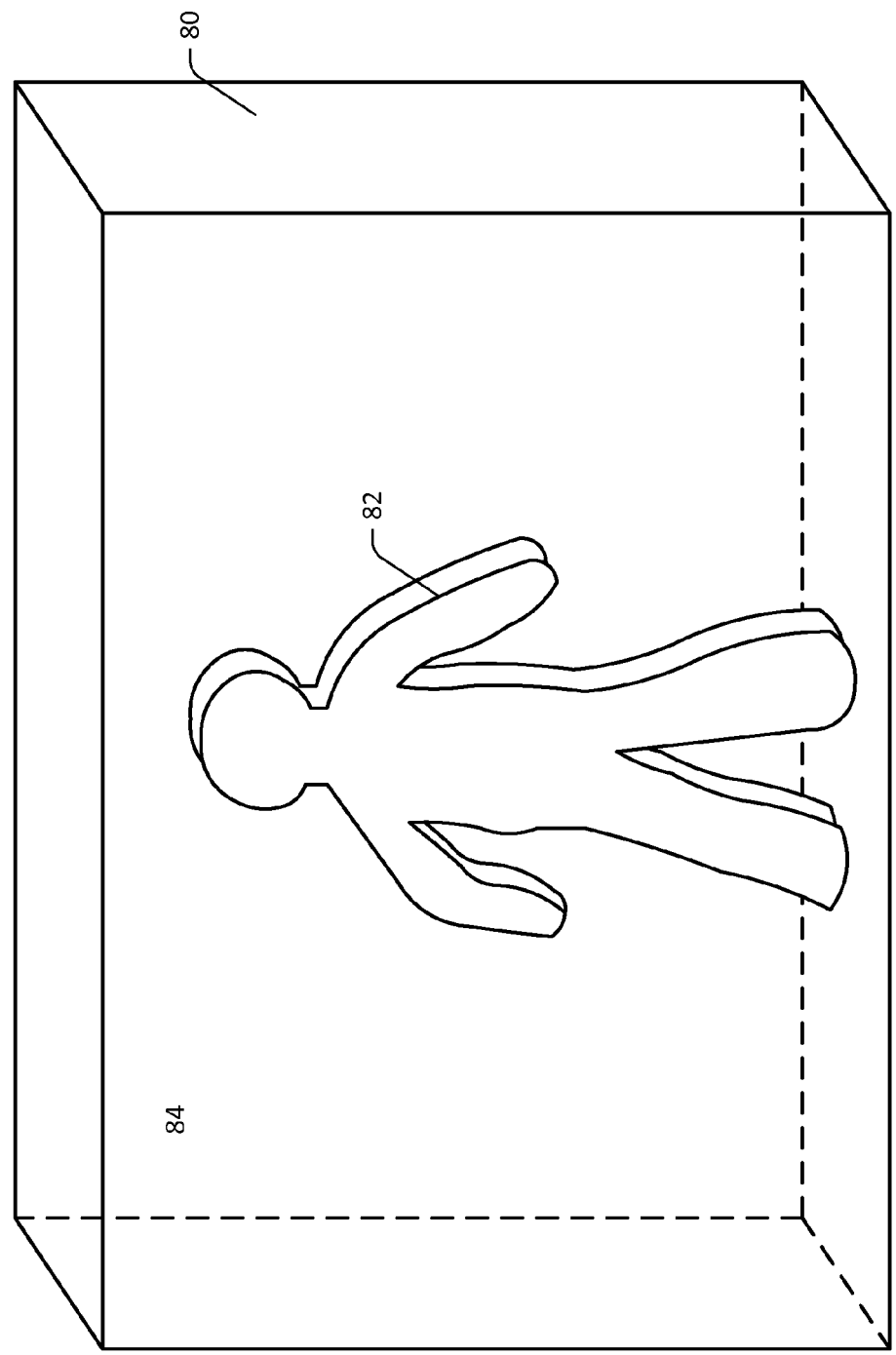
FIG. 5 depicts an example embodiment of a volumetric image.

FIG. 5 illustrates an example embodiment of a volumetric image 80 that may be generated by the tracking and processing system and/or the computing environment from a plurality of depth images, such as depth image 60, from pairs, triplets, etc. of stereo RGB images, or from silhouette images 70. As mentioned above, these images may be images or frames of a scene captured by, for example, 3D cameras 27 and/or RGB cameras 28 of the capture device(s) 20. The images may be captured by cameras or capture devices 20 at multiple different perspective views of the user. For example, the cameras or capture devices 20 may be mounted on different walls of a room. In one embodiment, such images may be captured substantially simultaneously. Once captured, a capture device 20 or computing environment 12 may use the multiple images to generate the volumetric image 80. As shown in FIG. 5, the volumetric image 80 may be a 3D image comprised of voxels (i.e., 3D pixels). The volumetric image 80 may include a human target 82 and one or more non-human targets 84 such as a wall, a table, a monitor, or the like in the captured scene. Each voxel of the volumetric image 80 may be associated with an occupancy. In some embodiments, the occupancy associated with each voxel may be surface-based (e.g., values of '1' for voxels on or near the surface of the body and '0' for all other voxels) or true physical occupancy (e.g., values of '1' for voxels near the surface of the body, on the surface, or inside the body and '0' for all other voxels). Surface based occupancies may be determined using techniques such as simple splatting, where a depth image pixel is back projected and added to the volumetric image 80, or using other signed distance functions. True physical occupancies may be determined using techniques such as space carving or visual hulls.

According to one embodiment, the volumetric image 80 may be used to determine the body pose of a user. The body may be divided into a series of segments defined by surfaces or the body or by whole volumes of the body. Each voxel of a volumetric image 80 may be assigned a probability that it is associated with each segment. This information may be provided to one or more processes which may determine the location of nodes, joints, centroids or the like to determine a skeletal model and interpret the motions of a user 82 for pose or gesture based command. In a further embodiment, rather than dividing the body into segments and assigning probabilities to voxels, the body may be defined by a set of 3D representations, such as 3D coordinates and variances, that are associated with surfaces of the body or whole volumes of the body. These 3D representations reference locations on a model body having a canonical pose, shape, and/or size. Such 3D representations may be calculated for each voxel of the volumetric image 80 and may be used along with the volumetric image 80 to determine the body pose of the user.

In one embodiment, upon receiving the depth images 60, silhouette images 70, or other images, those images may be downsampled to a lower processing resolution such that the volumetric image 80 generated from those images may be more easily used and/or more quickly processed with less computing overhead. In another embodiment, the images are not downsampled, but the resulting volumetric image 80 may be downsampled to a lower processing resolution. Additionally, one or more high-variance and/or noisy depth values may be removed and/or smoothed from the images or from the volumetric image 80; portions of missing and/or removed depth information may be filled in and/or reconstructed; and/or any other suitable processing may be performed on the received depth information may such that the depth information may used to size a virtual screen on a user as described above.

Figure 6:
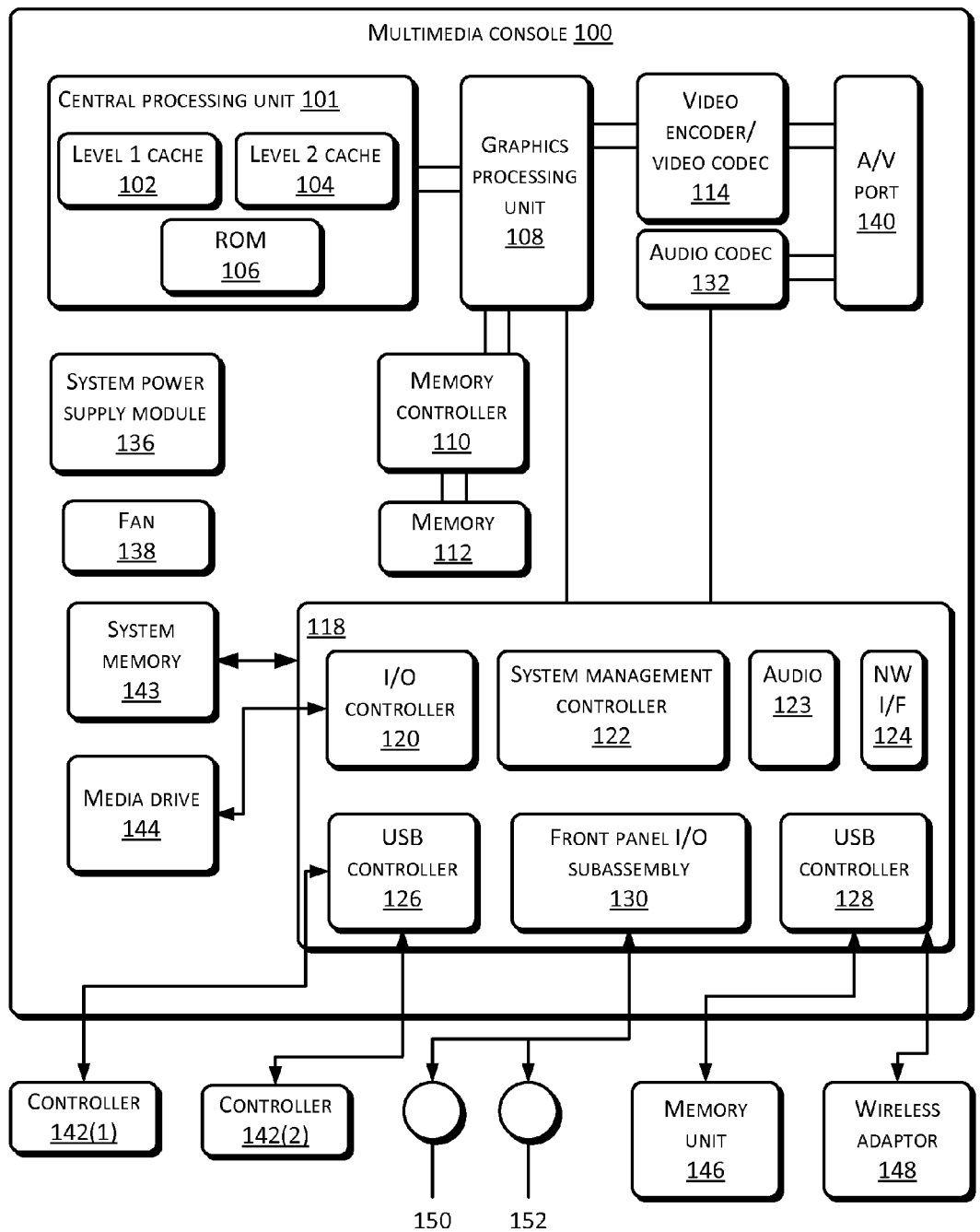
FIG. 6 illustrates an example embodiment of a computing environment that may be used to interpret one or more poses or gestures in a body pose estimation system.

FIG. 6 illustrates an example embodiment of a computing environment that may be used to interpret one or more gestures in a tracking and processing system. The computing environment such as the computing environment 12 described above with respect to FIGS. 1A-2 may be a multimedia console 100, such as a gaming console. As shown in FIG. 6, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus as well as to the CPU. The video processing pipeline outputs data to an AN (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the AN port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The front panel I/O subassembly 130 may include LEDs, a visual display screen, light bulbs, a speaker or any other means that may provide audio or visual feedback of the state of control of the multimedia control 100 to a user 18. For example, if the system is in a state where no users are detected by capture device 20, such a state may be reflected on front panel I/O subassembly 130. If the state of the system changes, for example, a user becomes bound to the system, the feedback state may be updated on the front panel I/O subassembly to reflect the change in states.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 27, 28 and capture device 20 may define additional input devices for the console 100.

Figure 7:
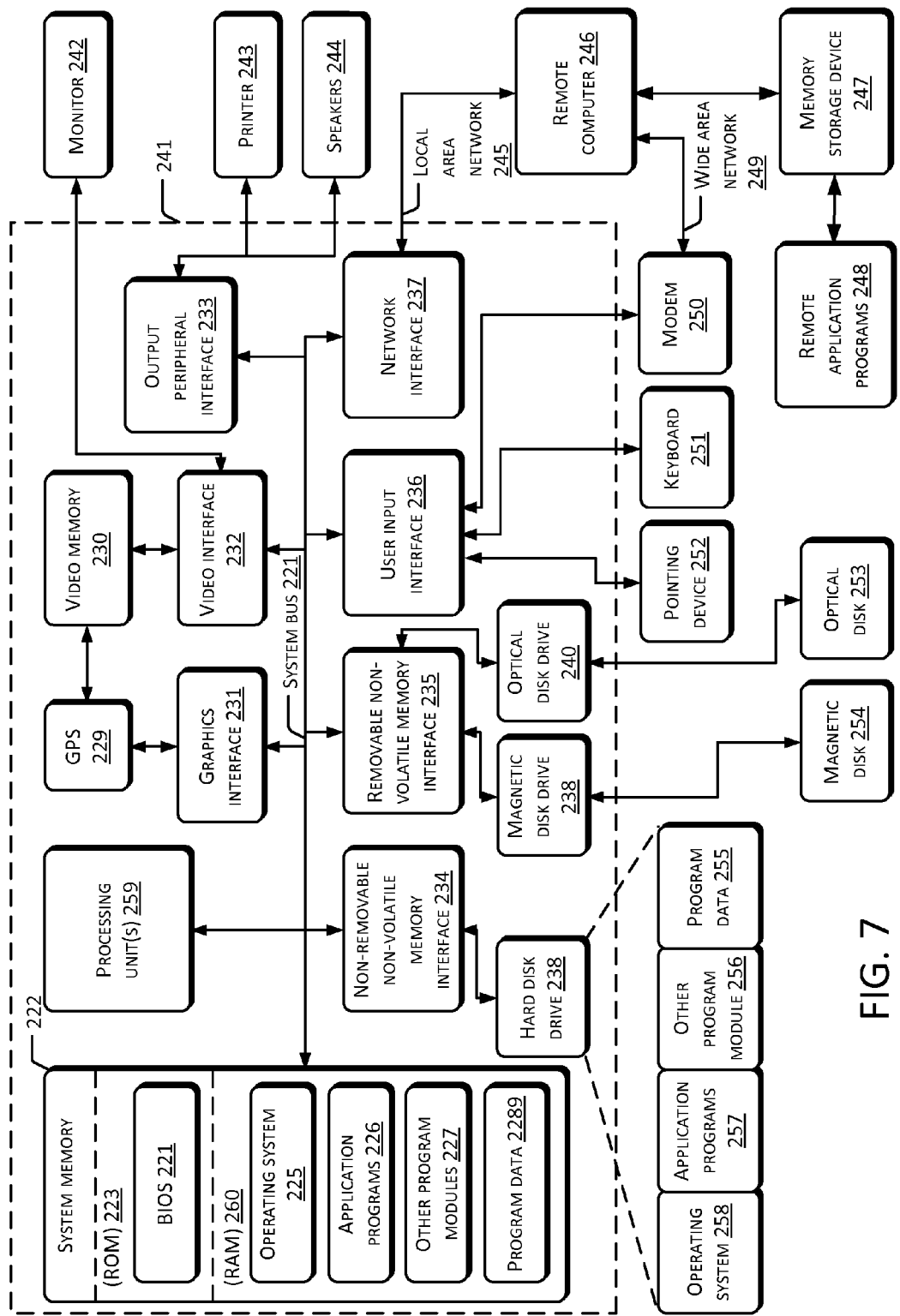
FIG. 7 illustrates another example embodiment of a computing environment that may be used to interpret one or more poses or gestures in a body pose estimation system.

FIG. 7 illustrates another example embodiment of a computing environment that may be the computing environment 12 shown in FIGS. 1A-2 used to interpret one or more poses or gestures in a tracking and processing system. The computing system environment of FIG. 7 is only one example of a suitable computing environment and is not intended to suggest any limitation as to the scope of use or functionality of the presently disclosed subject matter. Neither should the computing environment 12 be interpreted as having any dependency or requirement relating to any one or combination of components illustrated in the exemplary operating environment of FIG. 7. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 7, the computing environment comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 7 illustrates operating system 225, application programs 226, other program modules 227, and program data 228.

The computer 241 may also include other removable/non-removable, volatile/nonvolatile computer storage media. By way of example only, FIG. 7 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 7, provide storage of computer readable instructions, data structures, program modules and other data for the computer 241. In FIG. 7, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 27, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 7. The logical connections depicted in FIG. 7 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 7 illustrates remote application programs 248 as residing on memory device 247. It will be appreciated that the network connections shown are exemplary and other means of establishing a communications link between the computers may be used.

Figure 8:
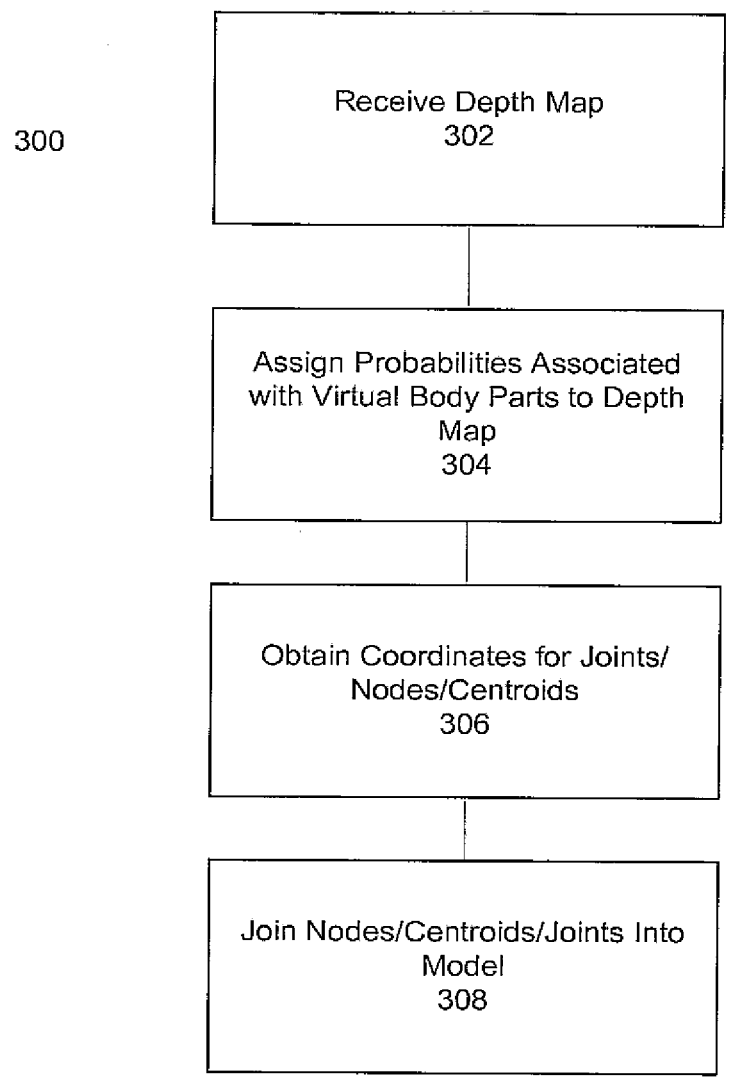
FIG. 8 depicts a flow diagram of an example method for body pose estimation.

FIG. 8 depicts a block diagram 300 whereby body pose estimation may be performed. In one embodiment, at 302, a depth map such as depth map 60 may be received by the tracking and processing system. Probabilities associated with one or more virtual body parts may be assigned to pixels on a depth map at 304. A centroid may be calculated for sets of associated pixels associated with a virtual body part, which may be a node, joint or centroid at 306. Centroids may be representations of joints or nodes of a body, and may be calculated using any mathematical algorithm, including, for example, averaging the coordinates of every pixel in a depth map having a threshold probability that it is associated with a body part, or, as another example, a linear regression technique. At 308, the various nodes, joints or centroids associated with the body parts may be combined into a model, which may be provided to one or more programs in a tracking and processing system. The model may include not only the location in three dimensions of the joints or body parts, but may also include the rotation of a joint or any other information about the pointing of the body part.

Body poses may be estimated for multiple users. In an embodiment, this may be accomplished by assuming a user segmentation. For example, values may be assigned to an image such that a value 0 represents background, value 1 represents user 1, value 2 represents user 2, etc. Given this player segmentation image, it is possible to classify all user 1 pixels and do a centroid finding, and then repeat this process for subsequent users. In another embodiment, background subtraction may be performed and the remaining foreground pixels (belonging to the multiple users) may then be classified. When computing centroids, it may be ensured that each centroid is spatially localized, so that a respective body part is present for each user. The centroids may then be combined into coherent models by, for example, connecting neighboring body parts throughout each user's body.

Figure 9:
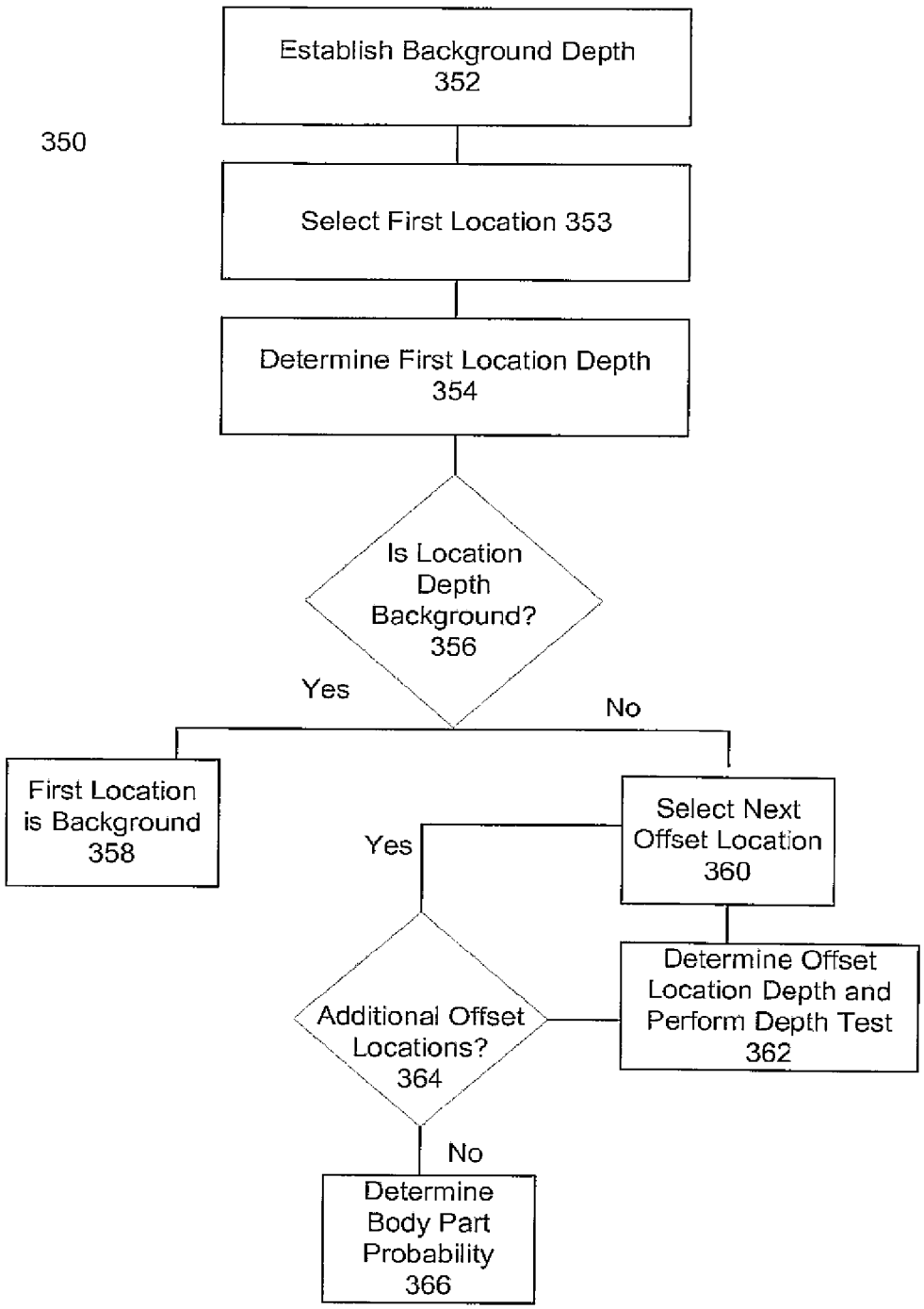
FIG. 9 depicts a flow diagram of an example depth feature test.

FIG. 9 depicts a sample flow chart for assigning probabilities associated with virtual body parts to a depth map. In an example embodiment, the process of FIG. 9 may be performed at 304 of FIG. 8. Process 350 may employ a depth map received at 302 to assign probabilities associated with virtual body parts at 304. One or more background depths on a depth map may be established at 352. For example, one background depth may correspond to a wall in the back of a room, other background depths may correspond to other humans or objects in the room. These background depths may be used later in flowchart of FIG. 9 to determine if a pixel on the depth map is part of a particular user's body or whether the pixel may be associated with the background.

At 353, a first location may be selected in the depth map. The depth of the first location may be determined at 354. At 356, the depth of the first location may be compared with one or more background depths. If the first location depth is at the same or within a specified threshold range of a background depth, then, at 358, the first location is determined to be part of the background and not part of any body parts. If the first location is not at or within a specified threshold range of a background depth, an offset location, referenced with respect to the first location, may be selected at 360. At 362, the depth of the offset location may be determined and a depth test may be performed to determine if the offset location is background. At 364, it is determined whether any additional offset locations are desired.

The determination of whether or not to select additional offset locations, as well as the angle and distance of the additional offset locations from the first location, may be made based in part on the depth of the previous offset location(s) with respect to the first location and/or the background. These determinations may also be made based on additional factors such as the training module described below. In one embodiment, the offsets will scale with depth. For example, if a user is very close to a detector in a capture area, depth may be measured at large offset distances from the first pixel. If the user were to move twice as far from a detector, then the offset distances may decrease by a factor of two. In one embodiment, this scaling causes the depth offset tests to be invariant. Any number of offset locations may be selected and depth tested, after which a probability that the first location is associated with one or more body parts is calculated at 366. This calculation may be based in part on the depth of the first location and the offset locations with respect to the one or more background depths. This calculation may also be made based on additional factors such as the training module described below.

In another embodiment, 352 may not be performed. In this embodiment, each pixel in a depth map is examined for depth at 354, and then the method proceeds directly to choosing offset locations at 360. In such an example, every pixel in a depth map may be examined for depth or for the probability that it is associated with one or more body parts and/or background. From the determinations made at the first pixel and the offset locations, probabilities may be associated with one or more pixels.

Figure 10:
FIG. 10 depicts an example embodiment of pixels measured in a depth feature/probability test.

FIG. 10 depicts an instance of the flow chart referenced in FIG. 9. In the flow chart of FIG. 9, a series of feature tests may be used to determine the probability that a pixel in a depth map is associated with one or more body parts. A first location pixel is selected at 480. A first offset pixel is examined at 482, and a second offset pixel is examined at 484. As more pixels are examined for depth, the probability that a particular pixel is associated with a part of the body may decrease or increase. This probability may be provided to other processes in a tracking and processing system.

In another example depicted by FIG. 10, a first location pixel of a depth map is selected at 480, wherein the depth map has probabilities that each pixel in the depth map is associated with one or more body parts already assigned to each pixel. A second offset pixel is examined for its associated probability at 484. As more pixels are examined for their associated probabilities, a second pass at the probability associated with the first pixel may provide a more accurate determination of the body part associated with the pixel. This probability may be provided to other processes in a tracking and processing system.

Figure 11:
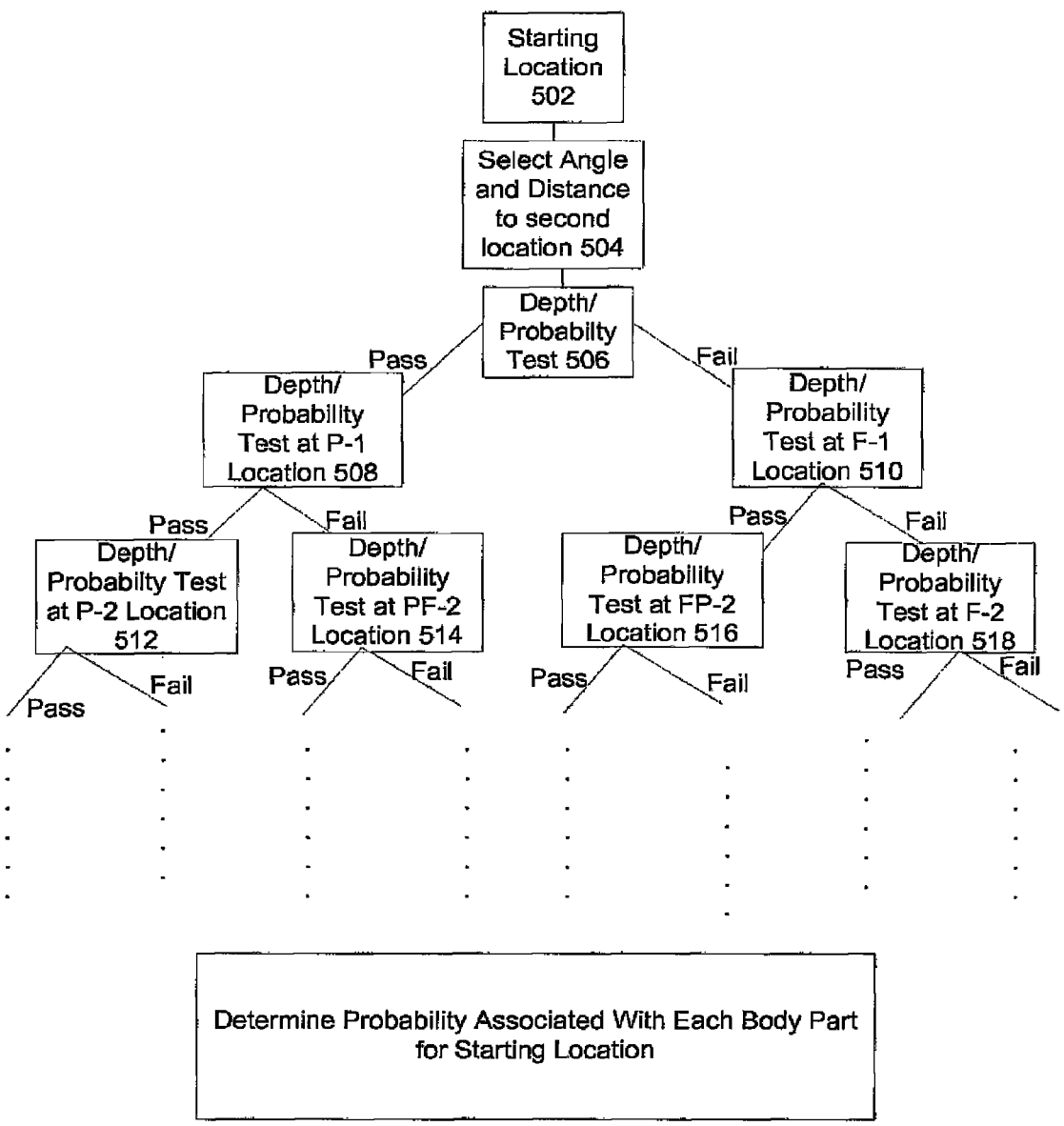
FIG. 11 depicts a flow diagram of an example embodiment of a depth feature/probability test tree.

FIG. 11 depicts a flow chart of another example implementation of feature testing in body pose estimation. A depth map is received and a first pixel location is selected at 502. This may be the pixel depicted at FIG. 10 as the first location. If the first pixel is at the background depth, then probabilities associated with each body part may be zero. If, however, the first pixel is not at the background depth, an angle and distance to a second pixel may be selected at 504.

In another embodiment, a background depth is not determined, instead depth tests and the surrounding offset depth tree tests may be performed at each pixel, regardless of its depth.

In another embodiment, the depth map received at 502 already has the probability that each pixel is associated with one or more body parts assigned to each pixel. Accordingly, instead of testing depth at the first pixel and at offset locations, the probabilities may be tested.

A depth/probability test may be performed on the second pixel at 506. If the second pixel fails the depth/probability test (i.e. it is at the background depth/probability, the depth/probability of a second user, not within the range of a users body or the like) then location F-1 is selected at 510. If, however, the second pixel passes the depth/probability test (i.e. it is within a threshold of the body depth/probability), then location P-1 is selected at 508. Depth/probability tests will then be performed on third pixels at 508 or 510, and based on whether the third pixels pass or fail the depth/probability test, other pixel locations will be selected at one of 512, 514, 516 or 518. While these locations may, in some cases, be the same, they may also vary widely in location based on the results of the depth/probability tests.

In an example embodiment, depth/probability tests on any number of pixels may be performed with reference to a single pixel. For example, 16 tests may be performed, where each depth/probability test is at a different pixel. By performing some quantity of depth/probability tests, the probability that a pixel is associated with each body part may be assigned to each pixel. As another example, only one test may need to be performed on a particular pixel in order to determine the probability that it is associated with one or more body parts.

FIG. 12 depicts an example image that may come from a capture device, such as capture device 20, a graphics package, or other 3D rendering along with a segmented body image of the example image. Original image 550 may be may be a depth map or other image from the capture device. In an example embodiment, the image of a body may be segmented into many parts as in segmented image 552, and each pixel in a depth map may be associated with a probability for each of the segments in FIG. 12. This probability may be determined using the methods, processes and systems described with respect to FIGS. 9, 10, and 11.

Figure 13:
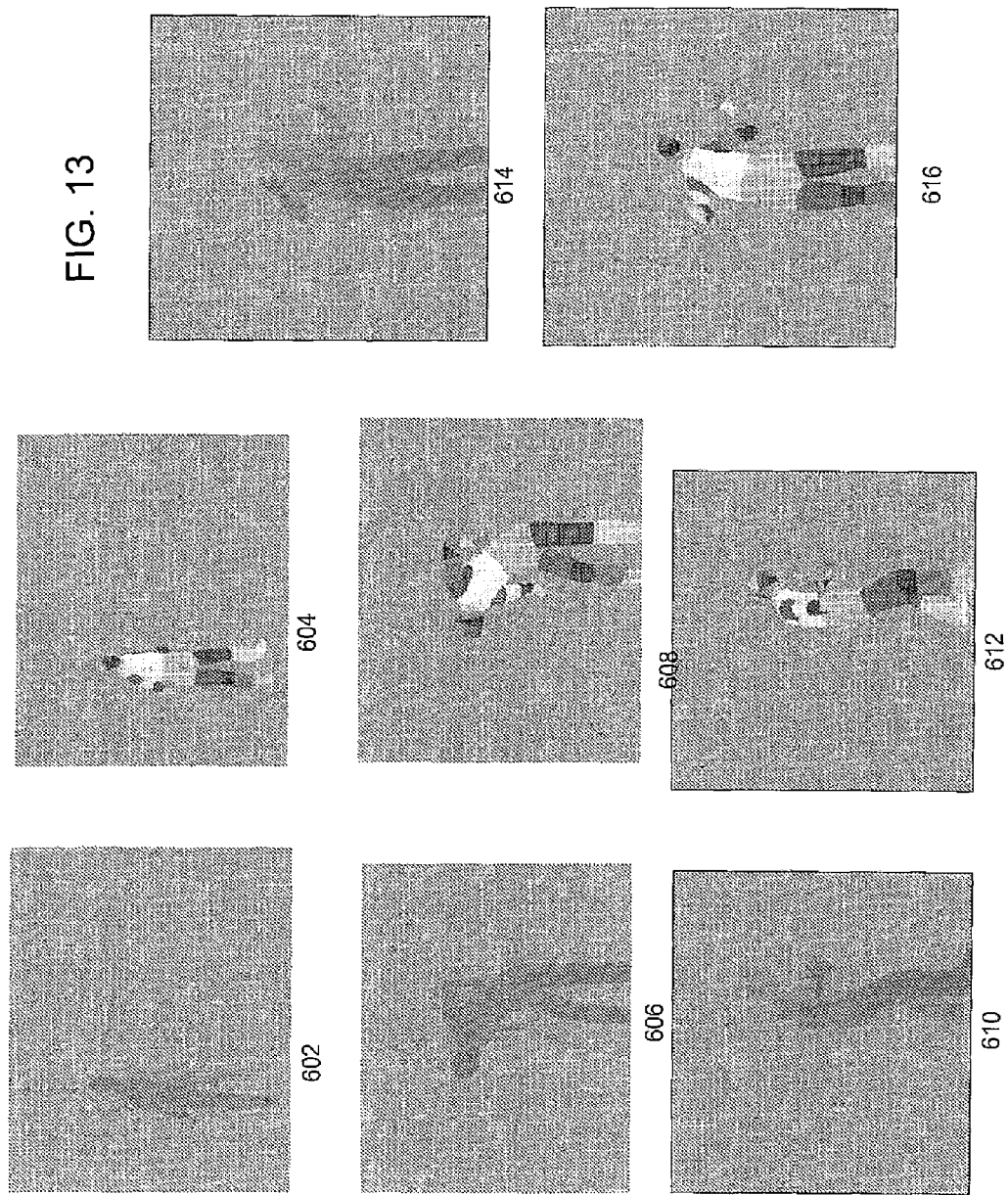
FIG. 13 depicts example embodiments of poses of a user and corresponding segmented images which may be used in a training program to create feature tests.

FIG. 13 depicts a series of images of poses from one or more users. For each pose, an image that may be received from a capture device such as capture device 20 is shown adjacent to an image of the pose that has been segmented into parts.

In a first embodiment, the tracking and processing system may receive the non-segmented images 602, 606, 610, and 614, and use the processes described at FIGS. 9, 10, and 11 to determine the probability that each pixel in the image is associated with each of the segmented body parts. The purpose of the processes described in FIGS. 9, 10, and 11 may be to segment the body into each of the parts shown at 604, 608, 612 and 616. These segmented parts may be used by one or more computer processes to determine the body pose of the user.

In a second embodiment, these images may be used in a feature test training module to determine the feature test of FIGS. 9, 10, and 11. Recall from FIGS. 9, 10, and 11 that a depth test may be performed on a pixel, and it either passes or fails, and based on the pass or fail, a next location will be selected. In one embodiment, the next location selected is not arbitrary, but is selected based on a training module. A training module may involve inputting a volume of thousands, hundreds of thousands, millions or any number of segmented poses such as those shown in FIG. 13 into a program. The program may perform one or more operations on the volume of poses to determine optimal feature tests for each pass or fail for the full volume, or some selection of poses. This optimized series of feature tests may be known as feature test trees.

A volume of poses input into a feature test training module may not contain every possible pose by a user. Further, it may increase the efficiency of the program to create several feature test training modules, each of which are based on a separate volume of body poses. Accordingly, the feature tests at each step of a feature test tree may be different and the final probabilities associated with each segment of a body at the conclusion of a test tree may also be different. In one embodiment, several feature test trees are provided for each pixel and the probabilities output from each test tree may be averaged or otherwise combined to provide a segmented image of a body pose.

Figure 14:
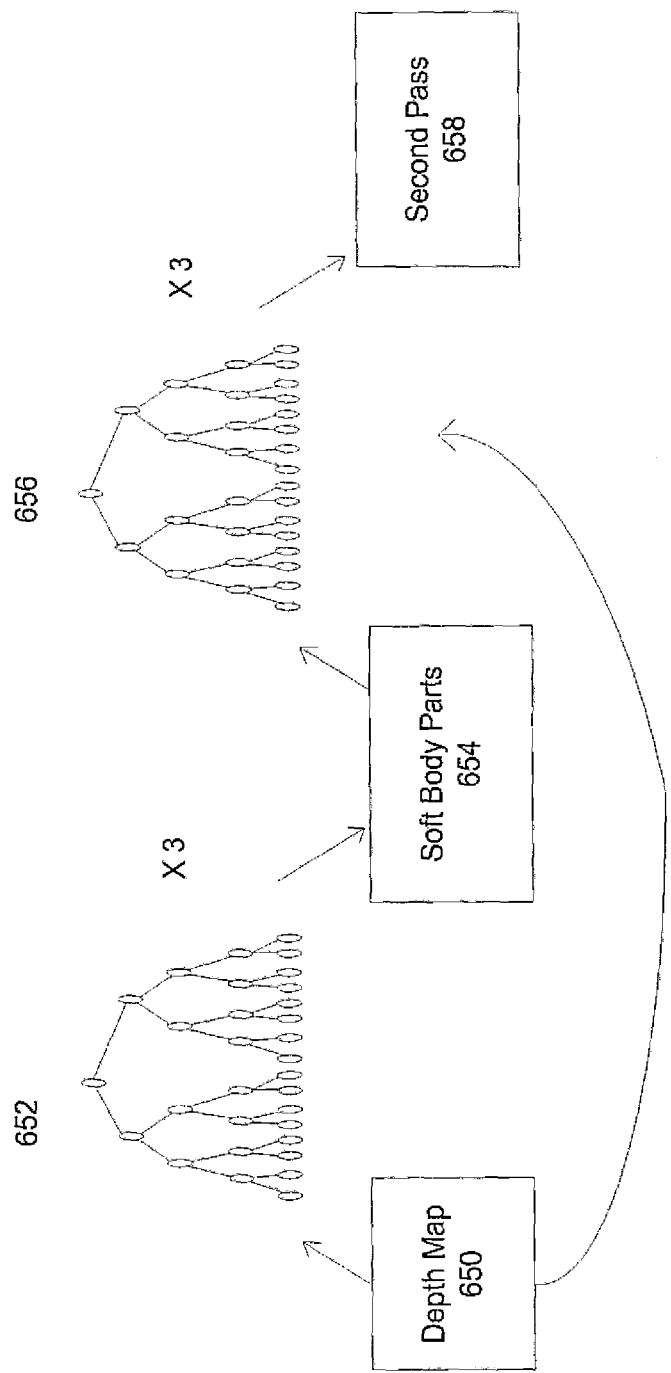
FIG. 14 depicts an example embodiment of assigning probabilities associated with body parts using multiple feature tests.

FIG. 14 depicts an example flow chart to determine body segment probabilities associated with each pixel in human body pose estimation. At 650 a depth map such as the depth map shown in FIG. 3 may be received from a capture device 20. This depth map may be provided to a series of feature test trees at 652. In FIG. 14, three feature test trees, each having been trained on a different volume of body poses, test each pixel of a depth map. The probability that each pixel is associated with each segment of the body is determined at 654 as the soft body parts. In an example embodiment, the process stops here and these probabilities may be used to obtain the joints/nodes/centroids of FIG. 8 at 306.

In another embodiment, at 656, the depth map may again be provided to a series of feature test trees, each of which may have been created using a different volume of body pose images. In FIG. 14, this second series of feature tests contains three trees, each of which may output a probability for each pixel of the depth map associated with each segment of a body. At 658, the probabilities from the second set of feature test trees 656 and the soft body parts from 654 may be combined by averaging or some other method to determine the second pass of the body parts. FIG. 14 shows two sets of three feature test trees, however, the number of feature test trees is not limited by the number three, nor are the number of passes limited by FIG. 14. There may be any number of feature test trees and any number of passes.

In another embodiment, at 656, the depth map provided to the series of feature test trees may have the probability that each pixel of a depth map is associated with one or more body parts already associated with each pixel. For example, the probability maps determined by the feature test trees at 652 may be provided to the feature test trees at 656. In such a circumstance, instead of depth test training programs and trees, the system instead utilizes probability test training programs and trees. The number of trees and passes is not limited in any way, and the trees may be any combination of depth and probability feature tests.

Figure 15:
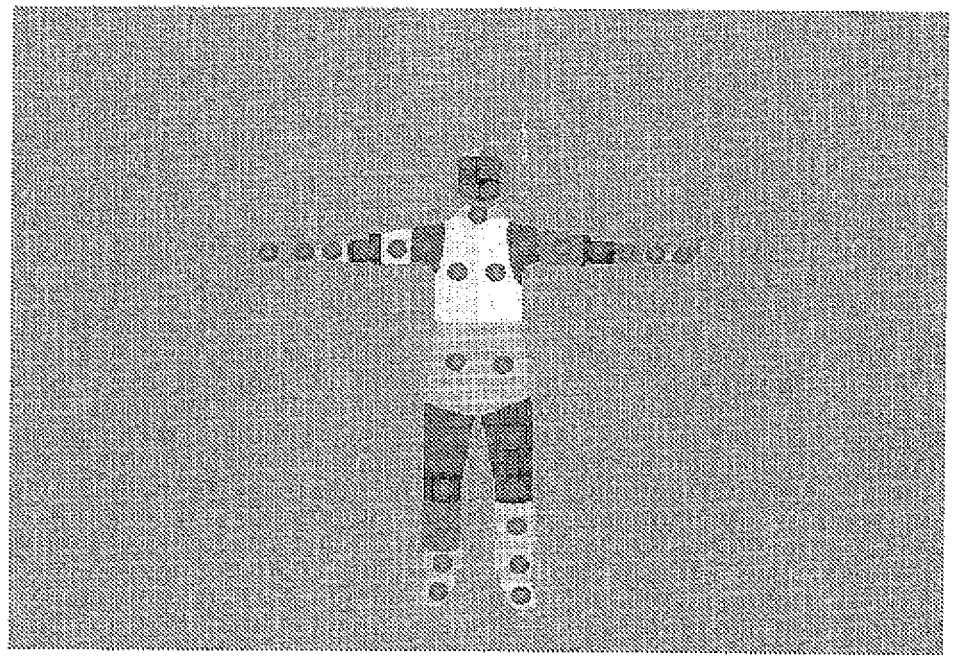
FIG. 15 depicts an example embodiment of centroids/joints/nodes of body parts in body pose estimation.

FIG. 15 depicts a segmented body pose image wherein each segment contains a node/joint/centroid, such as those described at 306 with reference to FIG. 8. These joints/nodes/centroids may be determined by taking the centroid of all of the pixels associated with a body part segment after performing the feature tests of FIGS. 9, 10, 11, and 14. Other methods may also be used to determine the location of the nodes/centroids/joints. For example, a filtering process may remove outlying pixels or the like, after which a process may take place to determine the location of the joints/nodes/centroids.

The joints/nodes/centroids of FIG. 15 may be used to construction a skeletal model, or otherwise represent the body pose of a user. This model may be used by the tracking and processing system in any way, including determining the commands of one or more users, identifying one or more users and the like.

Figure 16:
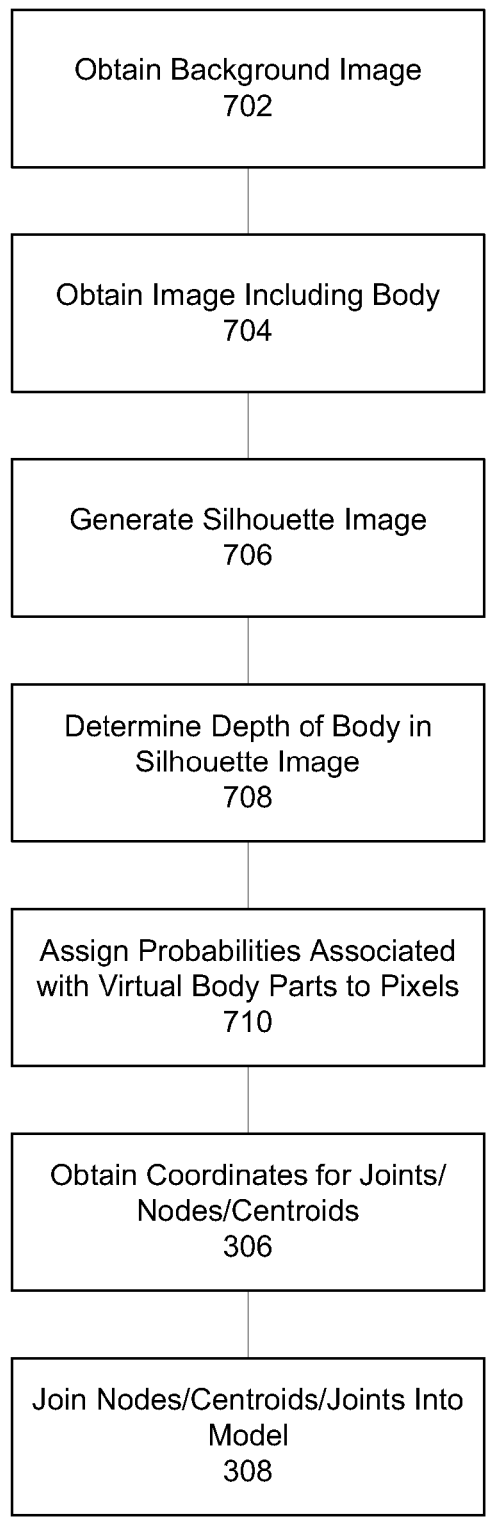
FIG. 16 depicts a flow diagram of an example method for body pose estimation using a silhouette image.

FIG. 16 depicts a block diagram 700 whereby body pose estimation may be performed. In one embodiment, at 702, the tracking and processing system may obtain a background image. As described above, the background image may be captured by a 2D, RGB camera 28 of a capture device 20 at a time when the user is not present before the capture device 20. Such a time might be, for example, when the computing environment 12 is inactive. Inactivity of the computing environment 12 may indicate that the user is not playing a game and thus not present in the field of view to be captured by the 2D, RGB camera 28. In another example, the capture device 20 or computing environment 12 may employ a motion sensor and may capture the background image if no motion is detected for a threshold amount of time. The background image obtained at 702 may be a 2D, RGB image comprised of a 2D pixel area. In other embodiments, the background image may be captured by a different camera or device or may be received from another source. In further embodiments, the background image may be generated by averaging over time static parts of images captured of a scene.

At block 704, the tracking and processing system may obtain an image that includes at least part of the body of the user. As described above, this image may also be captured by a 2D, RGB camera 28 of a capture device 20. The image may be captured at a time when the user is present before the capture device 20. Such a time or times may be determined based on, for example, whether the computing environment 12 is active or whether a motion sensor detects movement. The image including the user may also be a 2D, RGB image comprised of a 2D pixel area. In other embodiments, the image obtained at 704 may be captured by a different camera or device or may be received from another source.

At block 706, the tracking and processing system may generate a silhouette image, such as the silhouette image 70. As described above, the silhouette image may be generated from a background image and an image including the user using background subtraction algorithms, GrabCut algorithms, geodesic segmentation, or other techniques. Such background subtraction algorithms may compare RGB pixel values of pixel pairs and determine the degree of difference. If the degree of difference exceeds a threshold, the pixel of the image including the user is determined to belong to the foreground. If the difference does not exceed the threshold, the pixel of the image including the user is determined to belong to the background. The results of these determinations may be used to construct a binary mask image as the silhouette image. This silhouette image may comprise the image including the user with background pixels removed or may comprise the entire image including the user along with an index mapping pixels of that image to the foreground or background. In other embodiments, only a single image including the user is captured, and other image analysis techniques are utilized to distinguish the user from the background and form the silhouette image.

At block 708, the tracking and processing system may determine the depth of the user body in the silhouette image. As described above, the depth may be calculated based on observed depth values associated with the pixels of the foreground portion of the silhouette. These depth values may, for example, be captured using a low resolution depth sensor or some other mechanism. These depth values for foreground pixels may then be used in some sort of calculation to arrive at a single depth value for the foreground portion. For example, the depth values may be averaged to arrive at an average depth value. Such an average could be a weighted average or an unweighted average. In other embodiments, a default depth value is assigned to the foreground portion of the silhouette image. Such a default depth value could be associated with a distance from the capture device 20 that the user is instructed to stand.

At block 710, the tracking and processing system may assign probabilities associated with virtual body parts to pixels of the silhouette image. This assigning may involve a number of the operations described above with respect to assigning probabilities to a depth map, shown at 304 in FIG. 8. As mentioned, block 304 is illustrated in further detail in FIG. 9, which illustrates a process for performing the assigning of the probabilities. Blocks 352-358 of FIG. 9 show the determining of whether a selected test pixel of the depth map is part of the background by comparing a background depth to the pixel depth. If the pixel is not part of the background, an offset pixel location is selected at block 360 based on one or more decision trees, such as the tree illustrated in FIG. 11. The depth of the offset pixel location is then tested at block 362 to determine if that pixel is at the background depth. Blocks 360 and 362 may then be repeated for other offset locations, depending on the one or more decision trees, and the results of these tests may be used to determine a probability distribution for the selected test pixel at block 366. The operations of blocks 360-366 may then be repeated for each pixel of the depth image or carried out concurrently for each pixel. In some implementations, first probabilities may be known for the pixels and these first probabilities rather than depth values may be used in determining second probabilities for the pixels. The use of first probabilities in determining second probabilities is described above with regard to FIG. 11.

In assigning probabilities to the pixels of the silhouette image, however, it may not be necessary to determine if the selected test pixels are background pixels. Because the silhouette image separates background pixels from foreground pixels, the operations shown at blocks 360-366 of FIG. 9 may be performed for selected test pixels belonging to the foreground of the silhouette image without first having to perform the operations shown at blocks 352-358 of FIG. 9. In some embodiments, where a default depth value is used for the foreground of the silhouette image, the offset used for each test defined by the decision trees may be invariant, remaining constant and not adapting according to the user. In other embodiments, where the depth is calculated, the offset for each test defined by the decision trees may be scaled based, for example, on the amount of the silhouette image occupied by the foreground and/or on a known height of the player. Also, in performing tests for pixels of the silhouette image, one or more decision trees trained with silhouette image training data may be used. In embodiments where a default depth value is used for the foreground, the decision trees may be trained with data that expects a greater variance from the poses and their associated depth. The results of the assigning performed at block 710 are probability distributions for foreground image pixels. Further, in some embodiments, the operations shown in blocks 702-710 may be performed to determine probabilities for the pixels of multiple images. In such embodiments, the multiple images may be captured by multiple cameras and probabilities of the pixels from the generated silhouette images may be averaged together.

As shown in FIG. 16, after assigning probabilities to pixels of the silhouette image, the tracking and processing system may obtain coordinates for nodes/joints/centroids at block 306 and join joints/nodes/centroids into a model at block 308. Blocks 306 and 308 are described above and shown in FIG. 8. This model may correspond to the image of the user body captured in the foreground of the silhouette image, having the same pose as that user body. Thus, the pose of the model may be used to determine the captured pose of the user and may be used as pose input to a game or other application or activity of the user.

Figure 17:
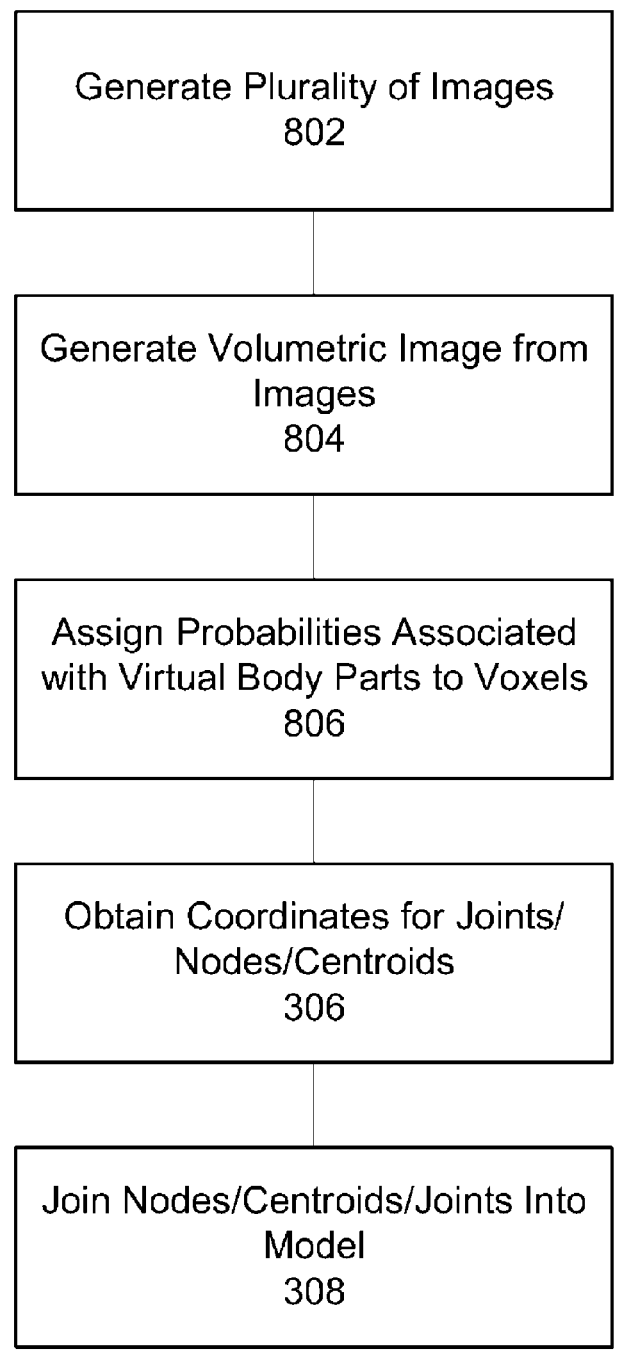
FIG. 17 depicts a flow diagram of an example method for body pose estimation using a volumetric image.

FIG. 17 depicts a block diagram 800 whereby body pose estimation may be performed. In one embodiment, at 802, the tracking and processing system may generate a plurality of depth images, silhouette images, stereo RGB images, monochrome images, or other images. As described above, generating the plurality of images may involve capturing a plurality of images with a plurality of cameras placed at different locations, such as on different walls of a user's room. In one embodiment, a camera may be placed on each wall of a room, allowing the user's body to be captured from multiple possible perspectives, such as front, back, left, and right. The cameras may capture the images substantially simultaneously to ensure that the images include a same body pose. In other embodiments, a single camera may be used to capture a plurality of images of a body pose of a rotating user, the user's rotation enabling the body pose to be captured from multiple views.

At block 804, the tracking and processing system generates a volumetric image of the user's body from the multiple images. As mentioned above, any of a number of known techniques may be used for generating the volumetric image from the images. The resulting volumetric image may be a complete 3D image of the user's body.

In some embodiments, occupancies may be calculated for each voxel of a volumetric image using known techniques, such as the above described surface based and true physical occupancy techniques. These occupancy values may distinguish voxels near or on the surface of the user's body from other voxels and, optionally also distinguish voxels inside the user's body from other voxels.

At block 806, the tracking and processing system may assign probabilities associated with virtual body parts to the voxels of the volumetric image associated with the user's body. This assigning may involve a number of the operations described above with respect to assigning probabilities to a depth map, shown at 304 in FIG. 8. In place of the depth values used in FIG. 8, however, occupancy values are used in assigning probabilities to voxels. Block 304 is illustrated in further detail in FIG. 9, and blocks 360-366 of FIG. 9 may be applicable to the assigning of probabilities to voxels of the volumetric image. At block 360, an offset voxel location is selected based on one or more decision trees, such as the tree illustrated in FIG. 11. The occupancy or another attribute of the offset voxel location is then tested at block 362 using feature tests specified nodes of by the decision trees. Example feature tests may include determining whether an offset voxel location is inside or outside of the body or determining how far the offset voxel location is from the surface of the body, the distance calculated using, for example, a distance transform. In one embodiment, the feature tests could be made orientation invariant by, for example, using the surface normal of the nearest point on the body's surface. Alternatively if the orientation angle of the user's facing direction is known, the feature tests can be explicitly rotated to give the classifier rotation invariance. Alternatively, the invariance is learned based on training data. The feature tests of the nodes of the decision trees may have been trained with sets of training data, each tree being trained with a different set of training data. These sets of training data may comprise sets of volumetric image training data. The volumetric image training data may be built directly from 3D computer graphics models of people or from rendering multiple views of the user and then using 3D reconstruction algorithms. Alternatively, the volumetric image training data could be real data captured of many users from multiple cameras. Blocks 360 and 362 may then be repeated for other offset voxel locations, and the results of these feature tests may be used to determine a probability distribution for a voxel being tested at block 366. The operations of blocks 360-366 may then be repeated for each voxel or may be carried out concurrently for each voxel. In some implementations, first probabilities may be known for the voxels and these first probabilities rather than occupancies may be used in determining second probabilities for the voxels. The use of first probabilities in determining second probabilities is described above with regard to FIG. 11. Further, in some embodiments, the operations shown in blocks 802-806 may be performed to determine probabilities for the voxels of multiple volumetric images. In such embodiments, the multiple volumetric images may be captured and probabilities of the voxels from the multiple volumetric images may be averaged together.

As shown in FIG. 16, after assigning probabilities to voxels of the volumetric image, the tracking and processing system may obtain coordinates for nodes/joints/centroids at block 306 and join joints/nodes/centroids into a model at block 308. Blocks 306 and 308 are described above and shown in FIG. 8. This model may correspond to the image of the user body captured in the volumetric image, having the same pose as that user body. Thus, the pose of the model may be used to determine the captured pose of the user and may be used as pose input to a game or other application or activity of the user.

Figure 18:
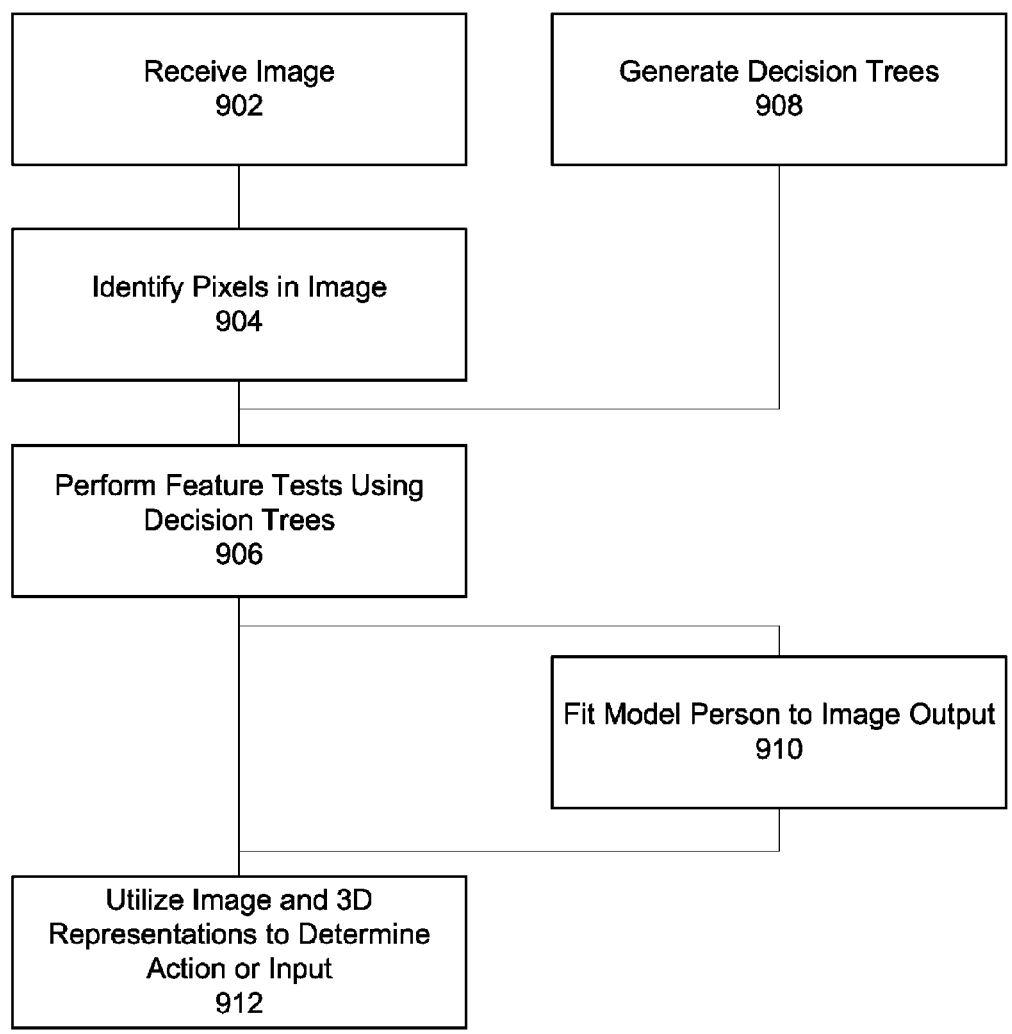
FIG. 18 depicts a flow diagram of an example method for determining three-dimensional representations for pixels or voxels in an image that may be used along with the image to estimate a body pose.

FIG. 18 depicts a block diagram 900 of an example method for determining three-dimensional representations for pixels or voxels in an image that may be used along with the image to estimate a body pose. This method may be used as an alternative to the probability determination and segmentation techniques described above or in addition to those techniques, as a post-processing step. As shown at block 902, a tracking and processing system may receive an image. The received image may be any of the depth images, silhouette images, stereo RGB images, monochrome images, or volumetric images described above. In some implementations, the received image may be generated from 2D, RGB images or depth images. The receiving and generating may be performed entirely or partially at one or both of the capture device(s) 20 or the computing environment 12.

At block 904, the tracking and processing system may identify pixels or voxels in the image. The identifying may involve selecting each pixel or voxel of the image as a test pixel or voxel for analysis using one or more decision trees. In one embodiment, only pixels or voxels that have been determined to be associated with the user's body are selected as test pixels or voxels. Test pixels or voxels may be selected and analyzed in parallel or serially. The identifying may also involve selecting one or more other pixels or voxels at offsets from the test pixel or voxel for use in feature tests specified at nodes of one or more decision trees. In various embodiments, the locations and number of offset pixels or voxels identified for each test pixel or voxel may be determined by the decision trees. As discussed above, these decision trees may be trained on sets of training data and the locations and number of the offset pixels or voxels may be determined by the decision trees based on their respective sets of training data. As also mentioned above, the offsets may be invariant or scaled.

At block 906, the tracking or processing system may perform feature tests using the decision trees. In some embodiments, at a root node of a decision tree, a binary feature test associated with the root node is performed on the test pixel or voxel. If the test pixel or voxel passes the feature test, a second pixel or voxel at a first offset location is selected and another feature test of a second node is performed on the second pixel or voxel. If the test pixel or voxel fails the feature test, a third pixel or voxel at a second offset location is selected and another feature test of a third node is performed on the third pixel or voxel. This selecting of different offset pixels or voxels and different nodes of a decision tree based on passing or failing feature tests may be performed recursively such that, when an offset pixel or voxel passes or fails a feature test, a further offset pixel or voxel at is selected and subject to a further feature test. An example decision tree is shown in FIG. 11 and is described above. The recursion or iteration through the decision tree may terminate at a leaf node of the decision tree. Each leaf node of the decision tree may be associated with a 3D representation, such as a 3D coordinate and variance. The 3D representation of the terminus leaf node is then determined as the 3D representation for the test pixel or voxel. In this way, using each pixel or voxel of the received image as a test pixel or voxel, 3D representations may be determined for each pixel or voxel of the image.

In some embodiments, the 3D representations each refer to a location on a model body having a canonical pose, shape, and or size. The use of the 3D representations and model bodies allows for the user's body pose to be specified in greater detail. The use of segments described above only allows a pixel or voxel to be associated with an entire body segment, such as a hand or forearm. Thus, pixels or voxels belonging to a same body segment are not distinguished for purposes of determining the user's pose. By using the 3D representations rather than body segments, multiple pixels or voxels that would be associated with a same segment are distinguished from each other and associated with different 3D representations. Also, in various embodiments, the 3D representation for a specific location on the user's body captured in the image is the same regardless of where within the image the specific location is found and regardless of the user's shape, size, and/or pose. Further, in some embodiments, the operations shown in blocks 902-906 may be performed to determine 3D representations for the pixels or voxels of multiple images. In such embodiments, the multiple images may be captured and 3D representations of the pixels or voxels from the multiple images may be averaged together, aggregated, or synthesized in some manner.

At block 908, the tracking and processing system or another system may generate the one or more decision trees used at blocks 904 and 906. As shown, this generation is performed prior to the use of the decision trees. Each decision tree is comprise of nodes, each node associated with a binary feature test and having two child nodes. Each child node may also be associated with a feature test and further descendant nodes or may be a leaf node associated with a 3D representation. Also, each child node that is associated with a feature test may also be associated with an offset pixel or voxel location that is subject to its feature test. In some embodiments, the operations shown at block 902-906 may be repeated multiple times for an image using different sets of decision trees. The 3D representations of a pixel or voxel for these repeated passes may then be averaged, aggregated, or synthesized in some fashion to generate a single 3D representation for each pixel or voxel, such as a synthesized/averaged or lowest variance 3D representation for each pixel or voxel.

In some embodiments, a decision tree may be generated based on a minimization function that seeks to minimize the variance between pixels or voxels for the training data that reaches a given node. For example, at the root node, all pixels or voxels of the training data may have their 3D representation averaged and may all reach the root node. At the root node, a feature test is performed such that the pixels or voxels of the training data are divided into subsets that pass and fail, each subset associated with a child node. The feature selected for the feature test in each node may be the feature that minimizes the average variance of the pixels or voxels reaching the node for each subset. The average variance may also be weighted by the proportion of pixels or voxels that passed or failed the test. For example, the variance for the root node may be a value such as 100. Using a first feature for the feature test at the root node results in subsets having variances of 50 and 70, and thus in an average variance of 60. Using a second feature for the feature test at the root node results in subsets having variances of 50 and 60, and thus in an average variance of 55. In this example, then, the second feature would be selected as the feature to use for the root node. This technique of minimizing the average variance of the subsets reaching each child node may be used at each node of the decision tree having a feature test to determine the feature used at that node. Also, as mentioned above, each decision tree may be generated using a different set of training data. The training data may comprise images of users in various poses where each pixel or voxel has a known 3D representation. In some embodiments, the 3D representations can be varied according to application to bias towards reduction in variance. For example, if disambiguating the left from right hand is prioritized, the 3D representation may be stretched along the axis of the arms of the model body. This would bias the variance reduction calculation to give more emphasis to splitting up the left/right hands. Similarly, if disambiguating fingers is prioritized, the fingers of model body may be stretched apart to bias the variance measure.

At block 910, the tracking or processing system may fit a model body onto the pixels or voxels of the image and their 3D representations, deforming the model body so that, for example, a 3D representation associated with a hand in the model body aligns with a same 3D representation determined for a pixel or voxel of an image. The result of such a fit operation may be a model body bent to the user's pose. In other embodiments, other techniques may be practiced to generate some sort of skeleton or model in the user's pose.

At block 912, the tracking or processing system may utilize the 3D representations and the image to determine an action or input associated with the user's pose. The posed model or skeleton may be compared to a library of gestures or poses that are each associated with some action or input. Upon determining a match, the action or input associated with the user's pose is carried out, thereby enabling a user to issue commands to a game or application by making different gestures or poses.

Figure 19:
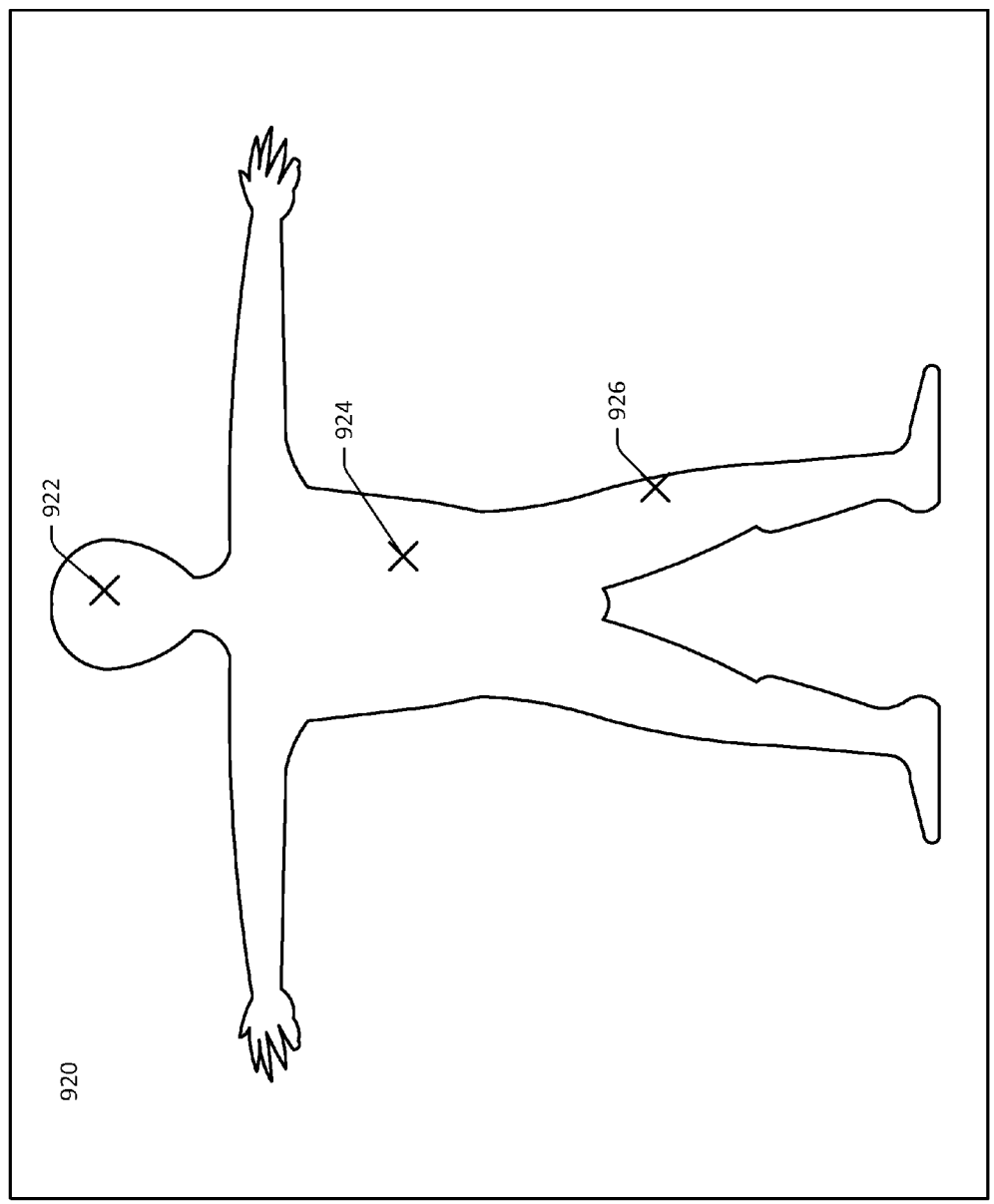
FIG. 19 depicts an example embodiment of a model body having a canonical pose, shape, and/or size for use in body pose estimation.

FIG. 19 depicts an example embodiment of a model body having a canonical pose, shape, and/or size for use in body pose estimation. As shown at 920, the model body may include a first location 922 having a first 3D representation, a second location 924 having a second 3D representation, and a third location 926 having a third 3D representation. These locations 922-926 may be perceived by someone viewing the model body as being associated with the head, the torso, and a leg, respectively, or the model body. The feet and legs of the model body may generally point downwards along a y-axis, the hands and arms may point obliquely away from the torso along an x-axis, and a z-axis may point through the user, from the front to the back of the torso. In some embodiments, such an arrangement of limbs may comprise the canonical pose. The canonical shape and size may be a function of an average user height and weight, among other factors and may be shared between many or all users regardless of varying characteristics of the users, such as differing weights, etc. Also, in some embodiments, the 3D representations constituting the model body can be quantized at a specific levels of detail into body parts, such as the above described segment.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and subcombinations of the various processes, systems and configurations, and other features, functions, acts, and/or properties disclosed herein, as well as equivalents thereof.

What is claimed:

1. A method for determining a position of a body using a set of one or more segments, each segment being associated with a portion of the body, the method comprising:
   receiving a silhouette image;
   identifying a set of one or more pixels in the silhouette image that are associated with at least part of the body, wherein the silhouette image is identified in place of a depth image; and
   for each pixel in the set of pixels, assigning to the pixel a probability that the pixel is within each segment in the set of segments.

2. The method of claim 1, wherein the silhouette image distinguishes between pixels belonging to the at least part of the body and pixels belonging to a background.

3. The method of claim 2, further comprising generating the silhouette image from a two-dimensional image or a three-dimensional image using a background subtraction algorithm, a GrabCut algorithm, or geodesic segmentation.

4. The method of claim 1, further comprising determining a depth of the pixels in the set of pixels.

5. The method of claim 4, wherein the depth is an average measured depth of the at least part of the body or a default depth.

6. The method of claim 1, wherein the probability is a first probability, and wherein assigning to the pixel the first probability that the pixel is within each segment comprises:
   determining at least one of depth or second probability at the pixel;
   selecting at least one other pixel each at some angle and distance from the pixel;
   determining at least one of depth or a second probability at each of the at least one other pixels; and
   performing the assigning of the first probability based at least in part on a relationship between the depth or the second probability at the pixel and the depth or the second probability at each of the at least one other pixels.

7. The method of claim 6, further comprising determining the distance and the angle of each other pixel from the pixel based at least in part on one or more decision trees, each tree being generated based at least in part on a different set of body pose data.

8. The method of claim 1, further comprising:
   using the assigned probabilities to determine a centroid pixel within each of the segments; and
   determining a location of one or more joints based at least in part on the centroid pixels.

9. A system for determining a position of a body using a set of one or more segments, each segment being associated with a portion of the body, the system comprising:
   a plurality of cameras for generating a plurality of images, at least one of the cameras being placed at a different angle with respect to another of the cameras;
   a processor that executes instructions to perform operations comprising:
      generating a volumetric image from the plurality of images in place of a depth map image;
      identifying a set of one or more voxels in a volumetric image that are associated with at least part of the body; and
      for each voxel in the set of voxels, assigning to the voxel a probability that the voxel is within each segment in the set of segments.

10. The system of claim 9, wherein the probability is a first probability, and wherein assigning to the voxel the first probability that the voxel is within each segment comprises:
- determining at least one of an occupancy or a second probability at the voxel;
- selecting at least one other voxel each at some angle and distance from the voxel;
- determining at least one of an occupancy or the second probability at each of the at least one other voxels; and
- performing the assigning of the first probability based at least in part on a relationship between the occupancy or the second probability at the voxel and the occupancy or the second probability at each of the at least one other voxels.

11. The system of claim 10, wherein the distance and the angle of each other voxel from the voxel is determined based at least in part on one or more decision trees, each tree being generated based at least in part on a different set of body pose data.

12. The system of claim 11, wherein sets of the body pose data comprise volumetric representations of body poses.

13. The system of claim 9, wherein the operations further comprise:
- using the assigned probabilities to determine a centroid voxel within each of the segments; and
- determining a location of one or more joints based at least in part on the centroid voxels.

14. One or more computer storage devices having recorded thereon computer executable instructions for associating locations on a body captured in an image with locations on a model body having a canonical pose, the instructions when executed causing a computing device to perform operations comprising:
- identifying a set of one or more pixels or voxels in the image that includes at least part of the body; and
- for each pixel or voxel in the set of pixels or voxels, determining a three-dimensional representation that is associated with a location on the model body such that multiple pixels or voxels associated with a same body segment are distinguished from one another, wherein the determining comprises performing feature tests at nodes of one or more decision trees.

15. The one or more computer storage devices of claim 14, wherein the image is a depth image, a silhouette image, or a volumetric image.

16. The one or more computer storage devices of claim 14, wherein the operations further comprise utilizing the determined three-dimensional representations and the image to ascertain a pose of the body captured in the image.

17. The one or more computer storage devices of claim 14, wherein the three-dimensional representation comprises a three-dimensional coordinate and a variance.

18. The one or more computer storage devices of claim 14, wherein the three-dimensional representation for a specific location on or in the body captured in the image is the same regardless of where within the image the specific location is found and regardless of a shape, a size, or a pose of the body.

19. The one or more computer storage devices of claim 14, wherein at least one of the one or more decision trees being generated based at least in part on a different set of body pose data that describes body poses using three-dimensional representations associated with locations on the model body.

20. The one or more computer storage devices of claim 19, wherein the operations further comprise generating the one or more decision trees, the generating including selecting a feature for a node of a decision tree based at least in part on an minimization function that minimizes spacial variance among examples that have a same result with respect to a binary test associated with the feature.

21. The one or more computer storage devices of claim 14, wherein the operations further comprise fitting a model person onto the pixels or voxels based at least in part on the three-dimensional representations determined for those pixels or voxels to estimate a user pose captured in the image.

* * * * *